United States Patent [19]

Kärnä et al.

[11] Patent Number: 5,346,649
[45] Date of Patent: Sep. 13, 1994

[54] CONDUCTING POLYMER MATERIAL AND METHOD FOR ITS PRODUCTION

[75] Inventors: Toivo Kärnä, Porvoo; Jukka Laakso, Helsinki, both of Finland; Kalle Levon, Brooklyn, N.Y.; Esko Savolainen, Hollola, Finland

[73] Assignee: Neste Oy, Kulloo, Finland

[21] Appl. No.: 988,902

[22] Filed: Dec. 4, 1992

[30] Foreign Application Priority Data

Dec. 5, 1991 [FI] Finland .................. 915760
Mar. 30, 1992 [FI] Finland .................. FI-915760
Aug. 11, 1992 [FI] Finland .................. 923580

[51] Int. Cl.⁵ .............................. H01B 1/00
[52] U.S. Cl. ...................... 252/500; 528/422; 528/423; 528/424; 528/210; 524/157
[58] Field of Search ............. 252/500; 528/422, 423, 528/424, 210; 524/157

[56] References Cited

U.S. PATENT DOCUMENTS

| | | | |
|---|---|---|---|
| 4,604,427 | 8/1986 | Roberts et al. | 252/500 |
| 4,983,690 | 1/1991 | Cameron | 252/500 |
| 5,002,700 | 3/1991 | Otagawa et al. | 252/500 |
| 5,006,278 | 4/1991 | Elsenbaumer | 252/500 |
| 5,069,820 | 12/1991 | Jen | 252/500 |
| 5,171,478 | 12/1992 | Han | 252/500 |

FOREIGN PATENT DOCUMENTS

| | | |
|---|---|---|
| 8901694 | 2/1989 | World Int. Prop. O. |
| 9001775 | 2/1990 | World Int. Prop. O. |
| 9010297 | 9/1990 | World Int. Prop. O. |
| 9013609 | 11/1990 | World Int. Prop. O. |

*Primary Examiner*—Paul Lieberman
*Assistant Examiner*—M. Kopec
*Attorney, Agent, or Firm*—Armstrong, Westerman, Hattori, McLeland & Naughton

[57] ABSTRACT

An electrically conducting plastic material is produced by blending a polyaniline or a derivative thereof with an organic sulfonic acid or a derivative thereof. A reaction product or blend of a polyaniline or a derivative thereof with an organic sulfonic acid or a derivative thereof can be brought to an easy-to-handle or directly melt-processable form through a heat-treatment process carried out at approx. +40° to +250° C. The obtained plastic material is advantageously further improved by blending the heat-treated reaction product or blend with a thermoplastic polymer and then melt-processing the mixed blend. The properties of the resulting compound material exhibit complete compatibility of the heat-treated reaction product or blend with the thermoplastic polymer.

14 Claims, 26 Drawing Sheets

CONDUCTING POLYMER MATERIAL AND METHOD FOR ITS PRODUCTION

FIELD OF THE INVENTION

The present invention relates to a method for producing a solid, electrically conducting polymer material in which a polyaniline or a derivative thereof is combined with a functionalized protonic acid or a derivative thereof. The invention also relates to a solid, conducting polymer material produced by way of the method, said polymer material being a product from a reaction of a polyaniline or a derivative thereof with a functionalized protonic acid or a derivative thereof.

BACKGROUND OF THE INVENTION

Currently, electrically conducting polymers are subjected to in-depth research worldwide. These polymers offer the possibility of replacing metallic conductors and semiconductive materials in a variety of applications including batteries, transducers, switches, photocells, circuit boards, heating elements, antistatic protection (ESD) and electromagnetic protection (EMI). Conducting polymers possess, i.a., the following advantages over metals: light weight, advantageous mechanical properties, good corrosion resistance and lower cost of synthesis and fabrication.

Conducting plastics can be coarsely divided into two different cathegories: filled conducting plastics in which a thermosetting or thermoplastic resin is made conductive by the addition of a conductive filler such as, e.g., carbon black or lampblack, carbon fiber, metal powder, etc., and intrinsically conducting plastics based on polymers made conductive by an oxidation or reduction (doping) process.

The electrical conductivity of filled conducting plastics is dependent on the mutual contacts formed between the conductive filler particles. Typically, approx. 10–50% wt. of a well dispersed filler material is required to achieve composites of high conductivity. Such conducting composite materials have, however, several drawbacks: The mechanical and some chemical properties of such composites are decisively degraded with the increase in the filler content and decrease in the polymer proportion; their conductivity becomes difficult to control particularly in the semiconductive range; and a stable and homogeneous dispersing of their filler into the matrix polymer becomes difficult.

Intrinsically conducting plastics can be produced from organic polymers having long chains containing conjugated carbon-carbon double bonds or double bonds and heteroatoms. Stable $\pi$-electron systems of double bonds and heteroatoms can be perturbed by adding to the polymer matrix certain doping agents which can be either of electron donor or acceptor type. Thus, the backbone chain of the polymer can be modified to contain electron holes and/or excess electrons that provide charge carriers for electric current along the conjugated chain.

The benefits of intrinsically conducting plastics include easy modification of their conductivity as a function of doping conditions, which is particularly accentuated in conjunction with low conductivities. Attainment of low conductivities with filled conducting plastics is difficult. Exemplifying kinds of intrinsically conducting polymers are polyacetylene, poly-p-phenylene, polypyrrole, polythiophene and polyaniline. The use of most intrinsically conducting plastics in the promising applications mentioned above is, however, limited by the inferior processability and stability properties of those polymers.

Generally, it can be expected that if it were possible to achieve a melt-processable compound material that combines the electrical properties of an intrinsically conducting polymer (for electrical conductivity) with the mechanical properties of a thermoplastic polymer, a conducting plastic material would result with superior characteristics over filled conducting plastic compound materials.

A technically and commercially promising intrinsically conducting polymer is polyaniline and its derivatives. An aniline polymer is based on an aniline unit in which the nitrogen atom is bonded to the para-carbon in the benzene ring of the next unit. Unsubstituted polyaniline can occur in several different forms such as leucoemeraldine, protoemeraldine, emeraldine, nigraniline and toluprotoemeraldine.

The so-called emeraldine base form of polyaniline is generally depicted with the molecular formula

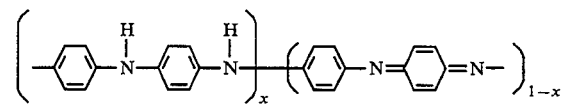

wherein x is approximately 0.5.

In similarity with almost all intrinsically conducting polymers, however, also polyaniline is plagued by poor processing properties which makes it difficult to fabricate this polymer into parts, films, fibers, etc. of desired form.

Polymers are generally processed along two major lines: melt processing and solution processing. Problems encountered in the melt processing of conductive polymers arise from the fact that the thermal decomposition of the polymer starts prior to its melting or plasticization. A problem in the solution processing of conductive polymers has been their Low solubility in conventional industrially used solvents. Another problem arises from the fact that, even though solution processing is applicable to processing of films and fibers from which the solvent can be evaporated, fabrication of practical parts with a desired shape is very different through solution processing.

Patent publication EP 432,929 discloses a few alternatives aimed at solving the above processability problems. U.S. Pat. Nos. 3,963,498 and 4,025,463 describe polyaniline oligomers which have less than 8 aniline units and are soluble in certain organic solvents. These oligomers lack, however, the good mechanical and chemical properties characteristic of polymers.

The closest approaches to industrially useful methods suited to practical applications are described in the following patent publications: U.S. Pat. No. 5,006,278, WO 8,901,694, WO 9,013,601, WO 9,010,297, WO 9,001,775 and U.S. Pat. No. 5,002,700. Of these, U.S. Pat. No. 5,006,278 discloses a conducting material achieved by mixing a solvent, a doping agent and polyaniline, whereafter the solvent is removed from the mixture. The patent publication WO 8,901,694 discloses a polyaniline polymer suited to solution processing; the conductivity of this polymer is achieved by doping with sulfonic acid. Such a polyaniline according to the patent publication is applicable to processing conducting polymers with, e.g., the following matrix plastics: PE (polyethene), PP (polypropene), PA (polyamide). Patent publication WO 9,013,601 describes a method for producing a conducting polymer blend by first preparing a mixed blend of the polyaniline and a doping agent in a suitable solvent, then blending this mixture with a polyamide, after which the solvent is evaporated. The doping agent is an aromatic multi-sulfonic acid. According to this publication the doping is typically performed at approx. +20°–+25° C. The doping takes place in a heterogenic reaction, after which the blend is dissolved in a suitable solvent. The processing is carried out with some solvent still present (page 15, line 23), which acts as a plasticizer.

Furthermore, the use of dodecylbenzenesulfonic acid as the doping agent for polyaniline is known from patent publications WO 9,010,297 and U.S. Pat. No. 5,002,700. On the other hand, patent publication WO 9,001,775 suggests the use of a multi-sulfonic acid as the doping agent for polyaniline featuring an improved temperature stability over other kinds of sulfonic acids. The examples of the abovementioned WO patent publication were carried out using a doping temperature of +20°–+25° C. at atmospheric pressure and the doping was carried out as a suspension of the polyaniline and the sulfonic acid in an aqueous solution of formic acid.

Publications related to the state of the art suggest rather widely that such processing methods are applicable to a variety of derivatives of polyaniline, and moreover, to be suited to both solution and melt processing. The exemplifications presented in the publications indicate, however, that practical processing conditions for polyaniline preprotonated with a suitable doping agent have been found only in some solution processing arrangements. In all examples of the abovementioned publications it has been necessary to dissolve the suspension of the polyaniline and the doping agent into a suitable solvent in order to achieve the homogenization of the blend. Evidently, this has been necessary in order to make the polymer blend sufficiently homogeneous and conducting. In any case, it is obvious that no processing methods suited to melt processing have been presented in prior art in the form of verified examples.

Melt processing also has the drawback that the doped polyaniline or the blend of polyaniline and a doping agent can generally be processed only once. This limitation makes it hard to produce a homogeneous melt-processable material in the form of, e.g., a granulate. Therefore, in prior-art melt processing tests the components have been mechanically blended just prior to their melt-processing into the final shape. Samples obtained from the tests have been characterized by varying conductivity and inhomogeneous quality.

As is evident from the state of the art, a mere blending of a solid polyaniline of the emeraldine base form and a doping agent (e.g. dodecylbenzenesulfonic acid, DBSA) fails to achieve a homogeneous doped polyaniline. The blending gives a so-called preprotonated polyaniline-dopant blend. Such a liquid blend or dispersed suspension is in an undefined form which is messy, highly corrosive and difficult to handle. Hence, in the examples of prior-art publications, a sufficient mixing for doping the polyaniline has been implemented by dissolving and/or dispersing both components of the blend in a mutually compatible solvent.

The abovedescribed problem associated with sufficient doping is also reflected in the preparation of a compound material of doped polyaniline and a thermoplastic polymer. Thus, the initial tests performed in conjunction with the present invention have indicated that a simple blending of a thermoplastic polymer with polyaniline and DBSA acting as the doping agent fails to give a homogeneous product which can be melt-processed into an electrically conducting part of desired shape. Test pieces made according to this method have visible defects such as various flow marks, blisters and cracks in addition to poor chemical properties. The problem arises from the poor incompatibility of the polyaniline and/or the doping agent or a doped polyaniline with a thermoplastic polymer during melt-processing conditions.

BRIEF DESCRIPTION OF THE INVENTION

It is an object of the present invention to achieve a polyaniline composition of high electrical conductivity. It is an additional object of the present invention to achieve an easy-to-handle conducting polyaniline composition which is homogeneous, non-tacky, non-corrosive and stable in melt processing conditions. The polyaniline must furthermore be compatible with other thermoplastic polymers so as to permit melt-processing into a compound material without additional steps such as solution processing. Good melt-processing properties should preferably be combined with a capability of the attained conducting polyaniline composition to tolerate multiple melt-processing cycles, e.g., granulation and the like without a significant reduction in its conductive and other physical and/or chemical properties. Moreover, one object of the invention is to achieve an inert and chemically stable conducting polyaniline composition and polymer materials comprised thereof.

The abovestated objects of the invention have been attained by a novel method and product thereof principally characterized by what is stated in the characterizing parts of claims 1 and 15. The discovery leading to these results is based on the fact that a solid, conducting plastic material with the abovementioned advantageous properties can be achieved through a process in which, subsequent to reacting a polyaniline or a derivative thereof with a functionalized protonic acid or a derivative thereof, said reaction product or a blend thereof is heat-treated at approx. +40° to +250° C.

DETAILED DESCRIPTION OF THE INVENTION

Figure 1:
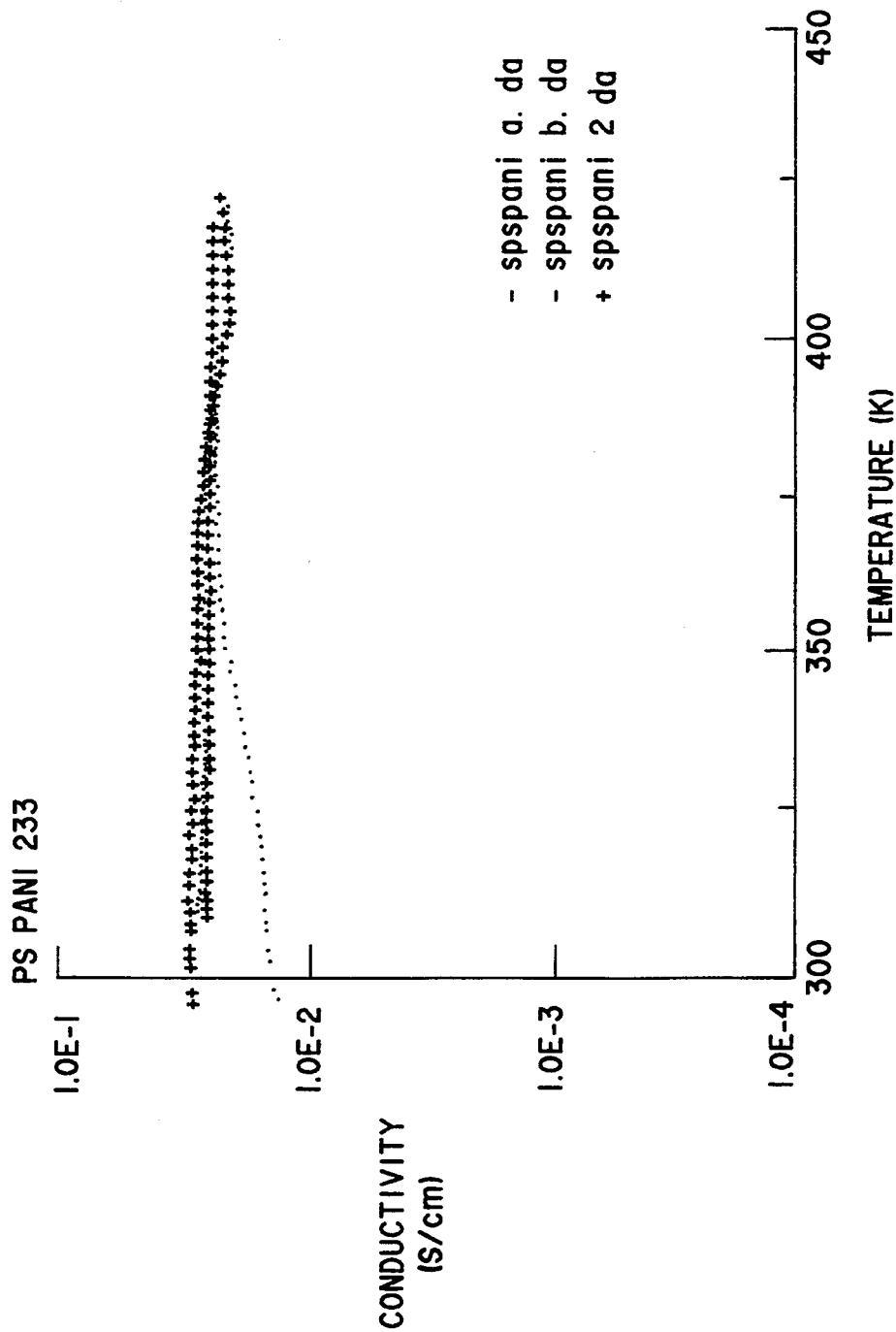
FIG. 1 is a plot of conductivity vs. temperature for test piece No. 53.

Surprisingly, it was discovered that a preprotonated blend of polyaniline or a derivative thereof with a functionalized protonic acid or a derivative thereof, which in liquid blend or dispersed suspension having an undefined, messy, highly corrosive, and difficult-to-handle form prior to heat treatment, assumes by virtue of the heat treatment a form which is homogeneous, solid, relatively inert and easy to handle as a powder or granulate.

In the method according to the present invention it was necessary to form a blend, or reaction product of polyaniline, or a derivative thereof, with a functionalized protonic acid or a derivative thereof, after which the blend or reaction product was subjected to heat-treatment while in a mixing apparatus. Only through this procedure was it possible to convert the treated blend or reaction product into a dry, solid material which, together with a thermoplastic polymer could be processed into homogeneous articles without visible flow marks or other surface defects and which simultaneously exhibited sufficient and homogeneous conductivity.

According to a preferred embodiment of the present invention the reaction product or blend of polyaniline or a derivative thereof with a functionalized protonic acid or a derivative thereof is heat-treated during a simultaneous mixing with, e.g., a screw mixer or a compounder. It has also been found, that such a screw mixer preferably has an open construction, and in particular, an open outlet end of the barrel.

As noted above, the invention in its broadest sense concerns the heattreatment of a reaction product or blend of polyaniline or a derivative thereof, with a functionalized protonic acid Or a derivative thereof in order to solidify the product and improve its properties. The best treatment is, according to one preferred embodiment of the invention, performed with a blend of merely polyaniline or a derivative thereof and merely a functionalized protonic acid or a derivative thereof without using any additional compounds such as solvents. This approach is based on the discovery, that the heat treatment solidifies the reaction product and improves its handling and processing properties. Consequently, probably the most preferred embodiment of this invention is associated with the processing properties of the product, and accordingly, the abovementioned reaction product or blend, is further mixed with a thermoplastic polymer and melt-processed into a compound material.

Melt-processing can take place at any temperature in which said thermoplastic polymer is conventionally melt-processed. Furthermore, the melt-processing method and the apparatus used in the method of this invention can be selected on the basis of the molten-state rheology of said thermoplastic polymer and the heat-treated conducting polyaniline composition. Typical examples of melt-processing apparatus are kneaders and screw mixers, die casting machines, compression or transfer molding machines, injection molding equipment and the like. The method and product according to the invention is particularly suited to injection molding, whereby the preferred grades of the thermoplastic polymer components are selectable among the most advantageous injection-moldable polymers.

The choice of optimal material components and reaction parameters for this method according to the invention gave the following preferable results: The mixture or reaction product of polyaniline or a derivative thereof and a functionalized protonic acid or a derivative thereof is preferably heat-treated at approx. $+80°-+210°$ C., optionally in an inert atmosphere. When the thermoplastic component is EVA, the heat treatment is advantageously carried out at approx. $+80°-+180°$ C.; while ABS is advantageously heat-treated at approx. $+90°-+190°$ C., a polyolefin is preferably heat-treated at approx. $+150°-+250°$ C., PS is advantageously heat-treated at approx. $+160°-+190°$ C., and stabilized PVC as the thermoplastic component is advantageously heat treated approx. $+180°-+250°$ C. The pressure applied during the heat treatment is advantageously $0-10^5$ kPa, preferably $1-10^4$ kPa. Preferably, the duration of the heat treatment is approx. 10 sec–20 min.

Publications related to the state of the art, e.g. WO90/10297, U.S. patent application Ser. No. 07/317,367, filed Mar. 1, 1989, which is hereby incorporated by reference contain lists of such derivates of polyaniline that are also applicable as the conducting polymer component according to the present invention.

The polyaniline or a derivative thereof is preferably an unsubstituted polyaniline which is in, e.g., the leucoemeraldine, protoemeraldine, emeraldine, nigraniline or toluprotoemeraldine form. The most advantageous form of unsubstituted polyaniline is the emeraldine base form.

The polyaniline acting as the conducting polymer component can be produced by any suitable means known in the art e.g., electrochemically or chemically. Ammonium persulfate as an oxidant and hydrochloric acid or sulfuric acid as a solvent. When the reaction product is treated with ammonium hydroxide in ethanol, the emeraldine base form of polyaniline is obtained that has a brownish color and is almost nonconducting.

Most suitable for conventional applications is such polyaniline (PANI) whose molar mass is at least approx. 5000 g/mol, advantageously approx. 40,000 g/mol. Because a single repeating unit of polyaniline is defined to contain two aniline units, the result is that the macromolecules of polyaniline should incorporate at least approx. 50 monomer units. In some special cases, however, the polymer can have a lower molecular weight or degree of polymerization.

A second component of the compositions of the present invention is a protonic acid that imparts a conductivity to the composition. As used herein, a "protonic acid" is an acid that protonates the polyaniline to form a salt complex with said polyaniline, which has a conductivity greater than about $10^{-6}$ S/cm. Preferred protonic acids are those that protonate the polyaniline to form a salt complex, said complex having an electrical conductivity of greater than about $10^{-3}$ S/cm, and particularly preferred protonic acids are those that impart a conductivity of greater than about 0.1 S/cm to the salt complex with polyaniline. Amongst these particularly preferred embodiments, most preferred are those embodiments in which said polyaniline salt complex has a conductivity of greater than 10 S/cm. Protonic acids are well known as dopants in the conductive polymer art as shown by the references U.S. Pat. No. 5,006,278, PCT Publications No. WO 90/13601 and U.S. patent application Ser. No. 07/350,806, filed May 12, 1989 and 90/10297, Synthetic Metals Vol, 48 (1992) pp. 91–97, which are hereby incorporated by reference.

The functionalized protonic acid or a derivative thereof of the present invention is preferably an aromatic sulfonic acid, and most preferably dodecylbenzenesulfonic acid (DBSA).

In the method according to the invention, the weight ratio of polyaniline (or a derivative thereof) to the sulfonic acid a derivative thereof) is preferably in the range of approx. 0.1 to 3, preferably approx. 0.125–0.5, computed on the basis of the emeraldine base form of polyaniline.

The exemplifying tests which were carried out proved that a heat-treated reaction product or blend produced in the method according to this invention can be melt-processed with essentially all major types of thermoplastic polymers. Such thermoplastic polymers are e.g. listed in WO 9,010,297, hereby incorporated by reference. According to an embodiment of this invention, the thermoplastic polymer is a homo or a copolymer or a blend thereof based on styrene or a derivative thereof. Such polymers are, e.g., polystyrene, styrene-acrylonitrile copolymers, acrylonitrilebutadiene-styrene copolymers, methylmethacrylate butadiene-styrene copolymers, poly-(p, m, and o)alkylstyrenes and poly-alpha-alkylstyrene and blends thereof.

The thermoplastic polymer can also be a vinyl homopolymer or copolymer, or a blend thereof, such as polyvinylchloride, polyvinylacetate, polyvinylalcohol and polyvinylacetals. The vinyl polymers are also considered to include acryl polymers such as polymethylmethacrylate.

The thermoplastic polymer can also be an olefin polymer or copolymer, or a blend thereof, such as polyethene, polypropylene, polybutylene or polymethylpentene and the like. It can also be a thermoplastic condensation polymer such as polyamide, linear polyester, polyacetal, polycarbonate and the like.

During melt-processing, the reaction product or blend formed by the heat-treated polyaniline, or a derivative thereof, and the functionalized protonic acid, or a derivative thereof, with the thermoplastic polymer, the weight ratio of these components can be adjusted covering a wide rheological range as long as a practical product can be processed, whereby an preferable proportion of PANI+DBSA is 0.01–100% wt., preferably 1–95% wt., and most preferably approx. 2–30% wt.

The proportion of the polyaniline and the functionalized protonic acid in the entire blend may also be below the proposed limits when, e.g., only a slightly antistatic characteristic of the product is desirable, i.e. when the conductivity is less than about $10^{-5}$ S/cm.

In the heat-treatment process of the reaction product or the blend of a polyaniline or a derivative thereof with a functionalized protonic acid or a derivative thereof, also during the heat-treatment stage itself a small amount of a thermoplastic polymer can be added. Then, the reaction product should contain maximally 50% wt., and preferably maximally 25% wt. of the thermoplastic polymer, which advantageously is the same polymer that is employed in the later melt-processing stage of the compound material formed by the heat-treated reaction product and the thermoplastic polymer. Consequently, this alternative must be understood as a kind of pretreatment with said thermoplastic polymer to improve the mutual compatibility of the polymer components.

The invention also concerns a solid, conducting plastic material produced by reacting a polyaniline or a derivative thereof with a functionalized protonic acid or a derivative thereof. The plastic material is solidified and processed into a workable form according to the invention by reacting a polyaniline or a derivative thereof with a functionalized protonic acid or a derivative thereof advantageously by heat treatment at approx. $+40°-+250°$ C. It is also possible to carry out the reaction for the complex formation at ambient temperature provided that the duration of the treatment is sufficiently long.

The conducting plastic material according to the invention has an unexpected and novel structure, since its properties are entirely different from those of a non-heat-treated reaction product or blend of a polyaniline or a derivative thereof and a functionalized protonic acid or a derivative thereof. Namely, the material is in the form of a dry powder or granulate, which in contrast to a non-treated reaction product or blend is not messy, highly corrosive or difficult to handle.

As mentioned above, the conducting plastic material according to the invention is a reaction product of a polyaniline or a derivative thereof with a functionalized protonic acid or a derivative thereof, said product being advantageously produced by heat-treating said reagents after they are mixed with each other.

The reaction product is characterized in that it exhibits, when tested using a differential scanning calorimeter (DSC), an exothermic peak not characteristic of polyaniline, indicative of a homogeneous phase transition in the range of the melting point.

While polyaniline has an endothermic range initially at 171° C., and after a heat treatment at 180° C., the conducting plastic material according to the invention has an exothermic range of 110°–170° C. Consequently, polyaniline is heat-consuming and the reaction product according to the invention is heat-releasing in the treatment.

The reaction product is also characterized by its X-ray diffraction pattern to have an interdigitated, layered crystalline structure different from that of polyaniline (which has a conventional crystalline structure).

The heat-treated reaction product or blend according to the invention is advantageously improved by blending it with a thermoplastic polymer and melt-processing these blended components into a compound material.

According to an embodiment of the invention, the compound material contains an oriented phase which according to the microscopic examinations vanishes at approximately 10°–20° C. below the melting point of the thermoplastic polymer component. Since the melting point of the thermoplastic polymer component of the compound material is lower than that of the employed thermoplastic polymer in pure form, it can be assumed that the conducting plastic material is at least partly dissolved in the thermoplastic polymer.

Figure 3:
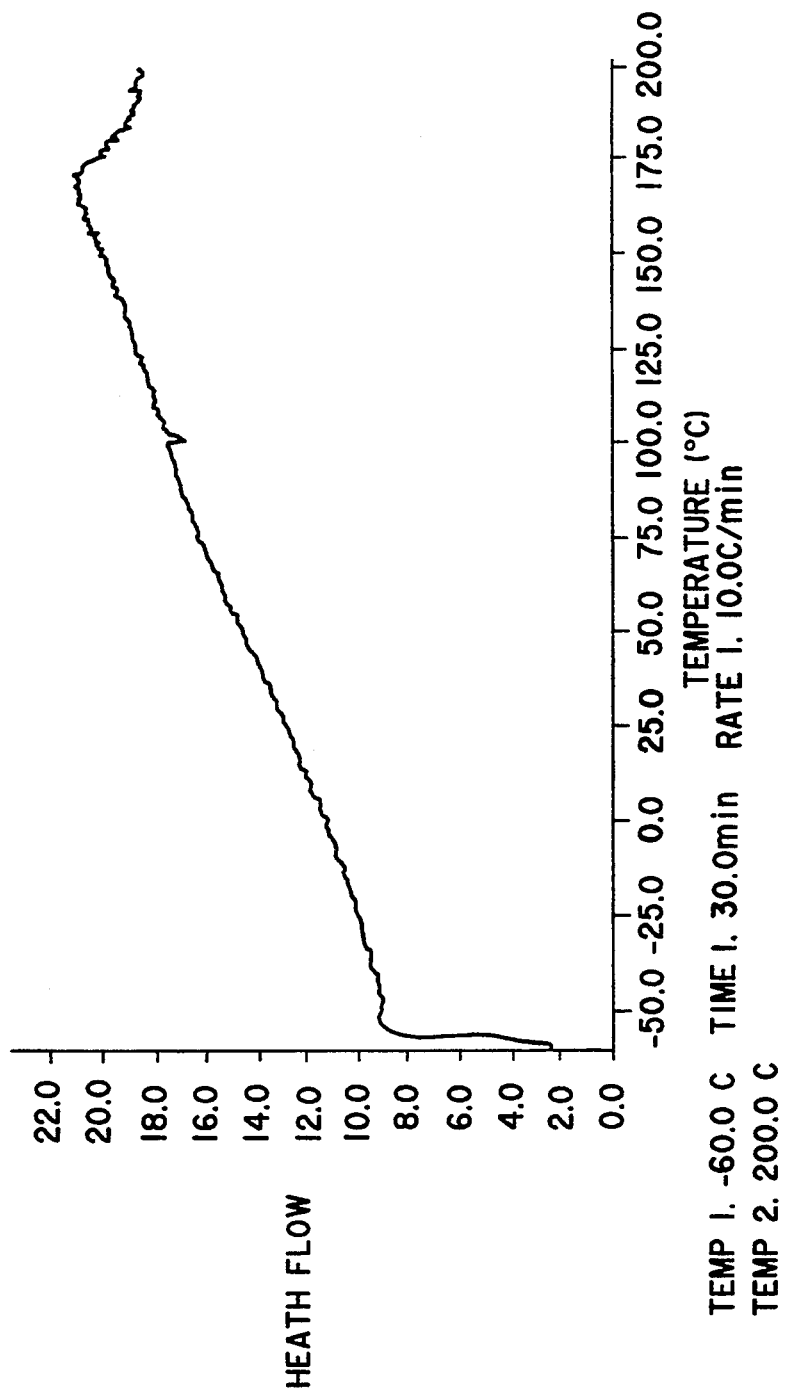
FIG. 3 is a DSC-thermogram of polyaniline.
Figure 4:
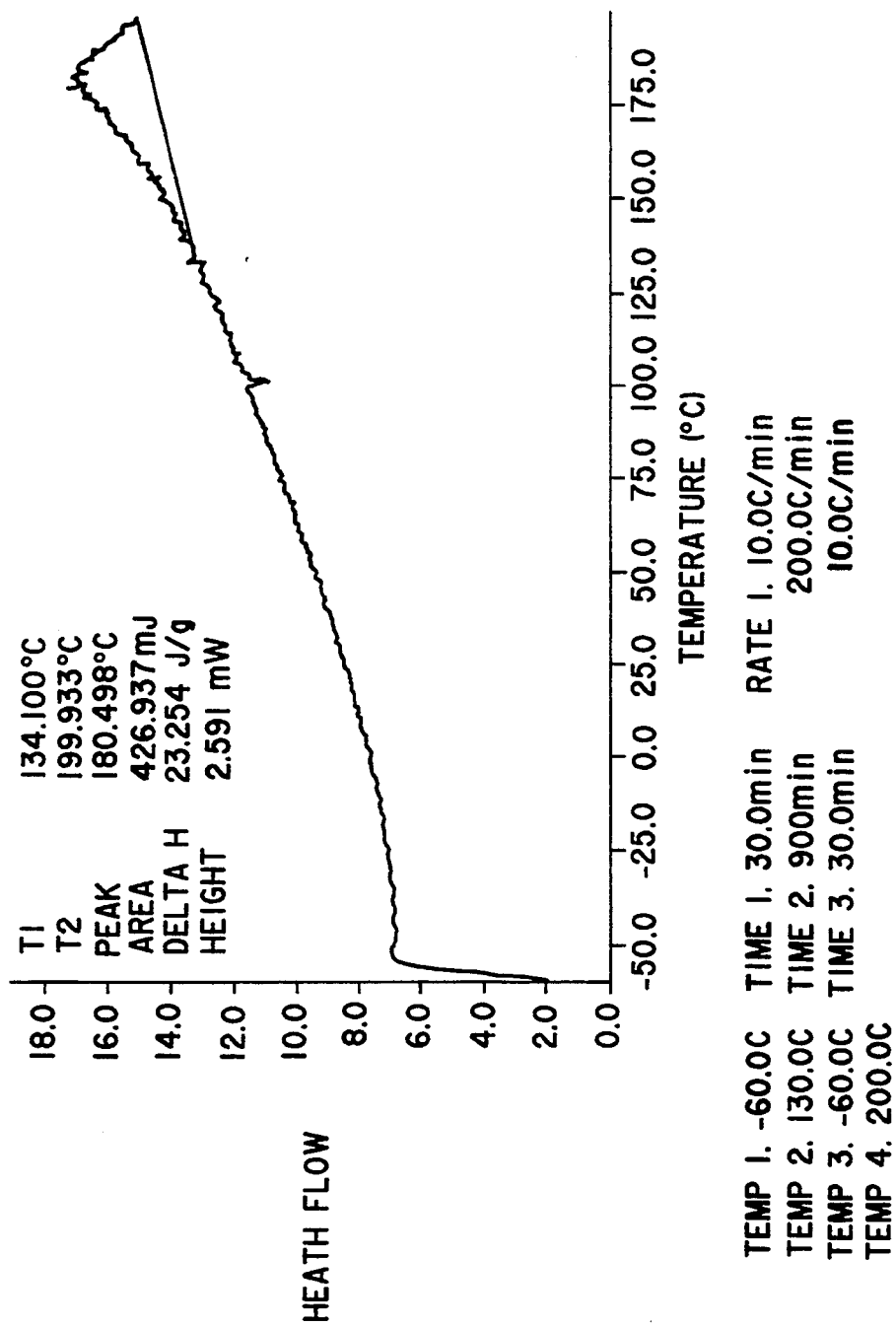
FIG. 4 is a DSC-thermogram of polyaniline with a quantitative determination of the peak valve.
Figure 5:
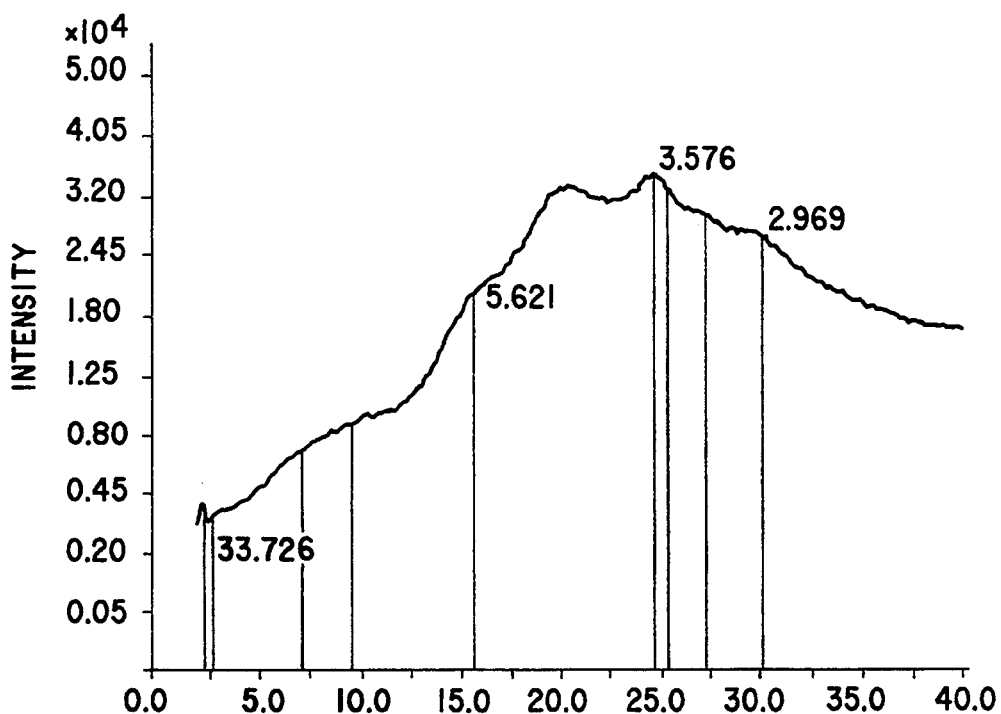
FIG. 5 is an X-ray diffraction pattern of polyaniline.

The starting material, polyaniline in its emeraldine base (EB) form does not have distinguishable crystallinity but three-dimensional crystallinity can be detected either when EB is reduced or doped with a protonic acid. In both cases the crystallinity is mainly evolved due to the increased hydrogen bonding between the chains. The heat of fusion of the crystal is seen as an endothermic heat (FIG. 3) with a peak value around 180° C. (FIG. 4). This crystallinity can also be observed by X-ray diffraction experiments where the main d-spacings indicating the scattering from the ordered units are 5.6, 4.4, 3.6 and 3.0 Å (FIG. 5).

Figure 6:
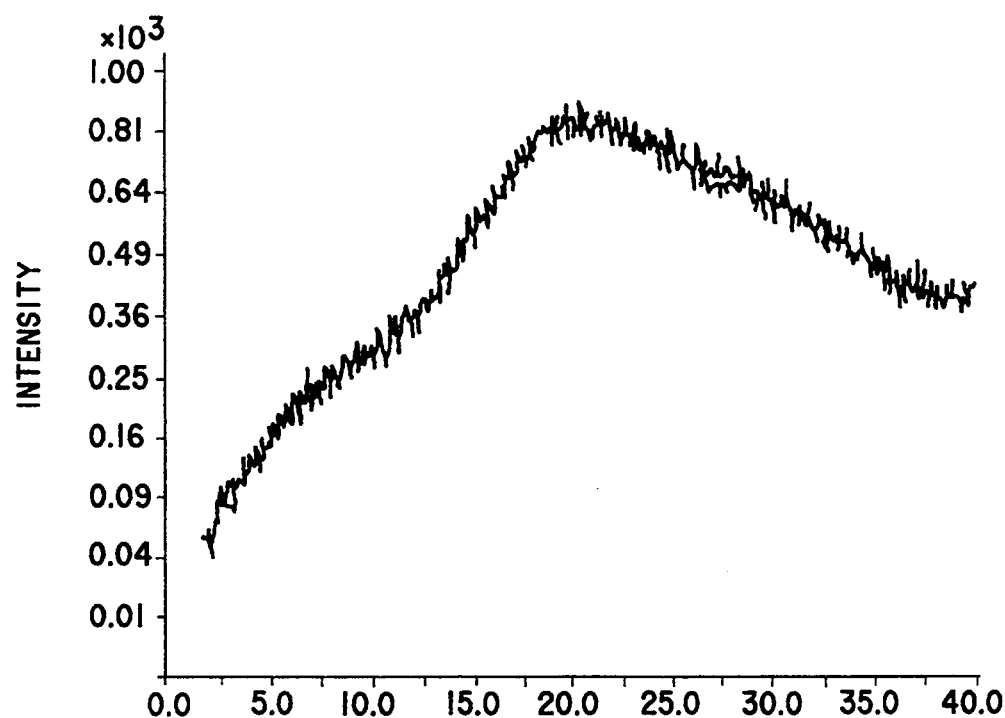
FIG. 6 is an X-ray diffraction pattern of polyaniline after annealing above the melting temperature.

This crystallinity is greatly dependent on the synthesis and purification conditions and the thermal history of the sample. On the second heat of this previously shown sample the crystallinity is not anymore seen (FIG. 6) because crystallization conditions were changed.

Figure 7:
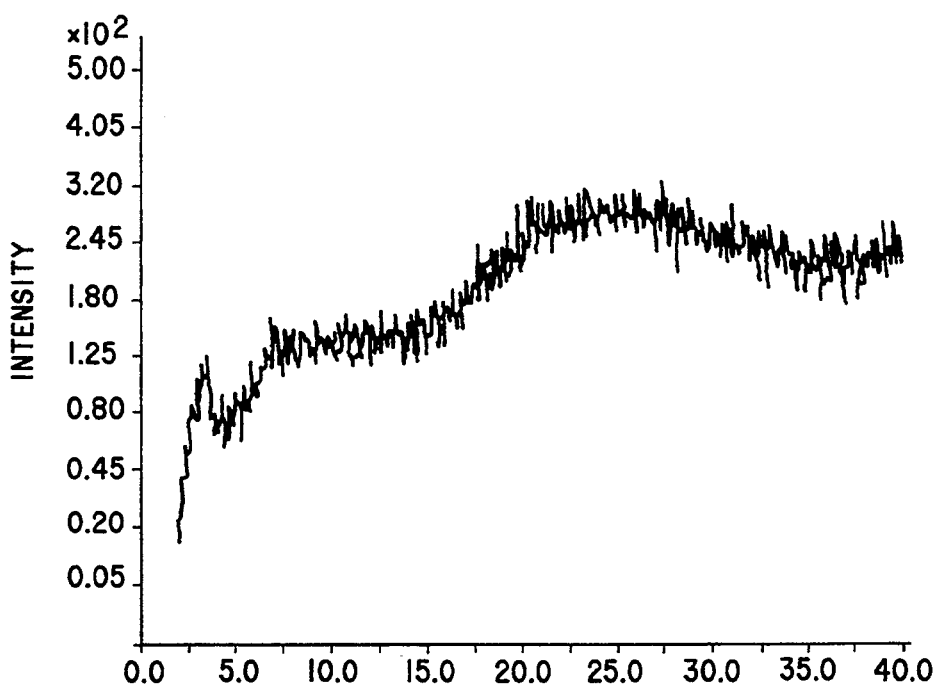
FIG. 7 is an X-ray diffraction of PANI/DBSA mixture.
Figure 8:
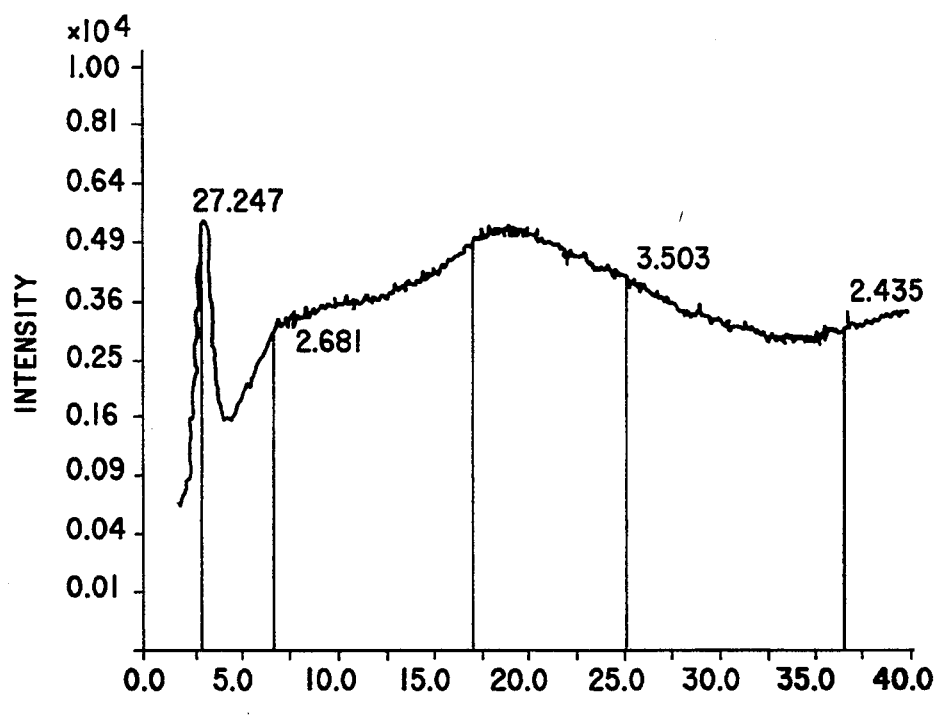
FIG. 8 is an X-ray diffraction of PANI/DBSA mixture.

The reaction product is also characterized in that using X-ray diffractometry it can be shown to have layered crystalline structure (FIG. 7) different from that of polyaniline which has only possibly the above mentioned three-dimensional crystallinity. The layered structure is most conveniently identified by the small-angle scattering which identifies the distance between the polymer backbone chains (FIG. 8). This distance (27.3 Å) depends on length of substituent in the protonic acid (for instance in the case of DBSA, dodecyl benzene group) and on the thermal history of the sample. It is possible that these side-chains also interdigitate as shown schematically in FIG. 9.

Figure 10:
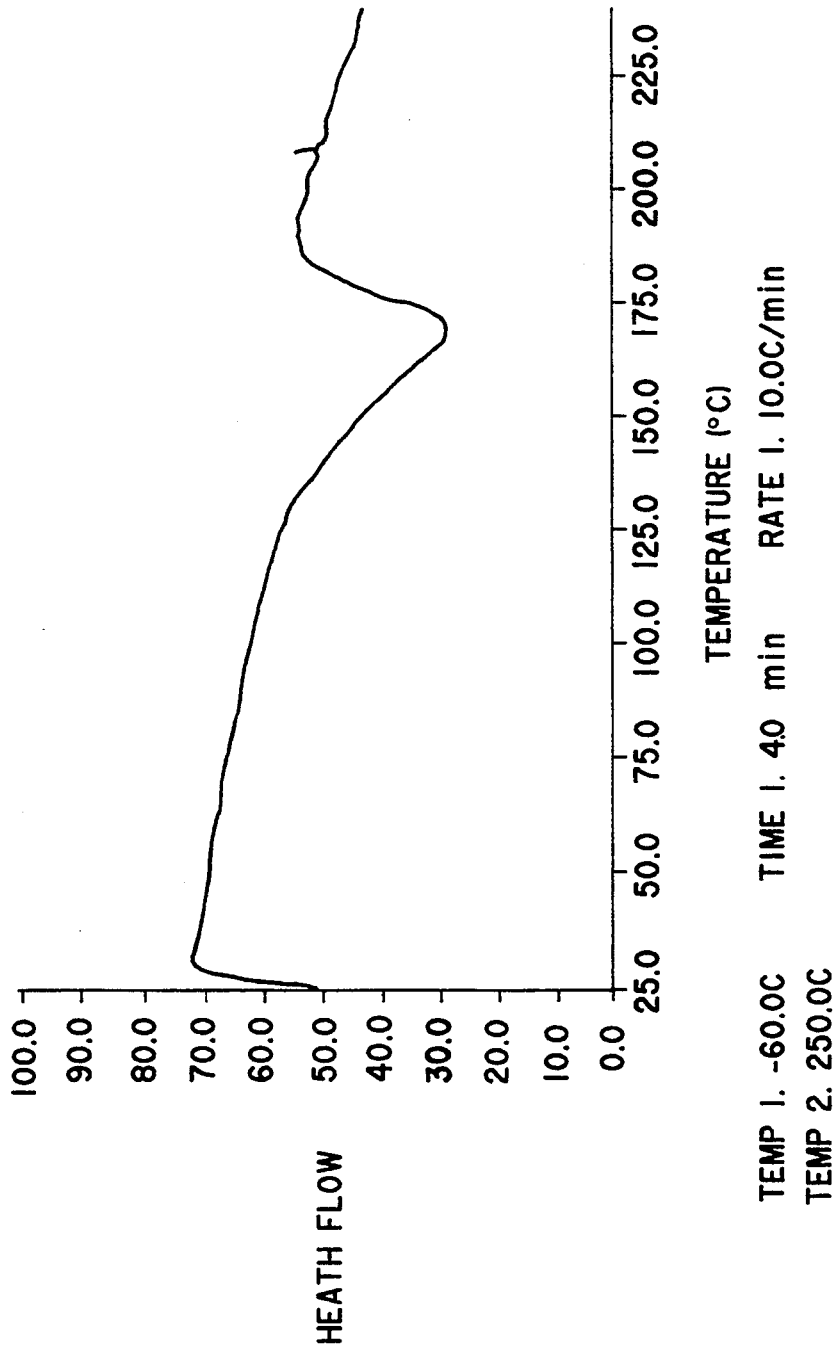
FIG. 10 is a DSC-thermogram of the complexation.
Figure 11:
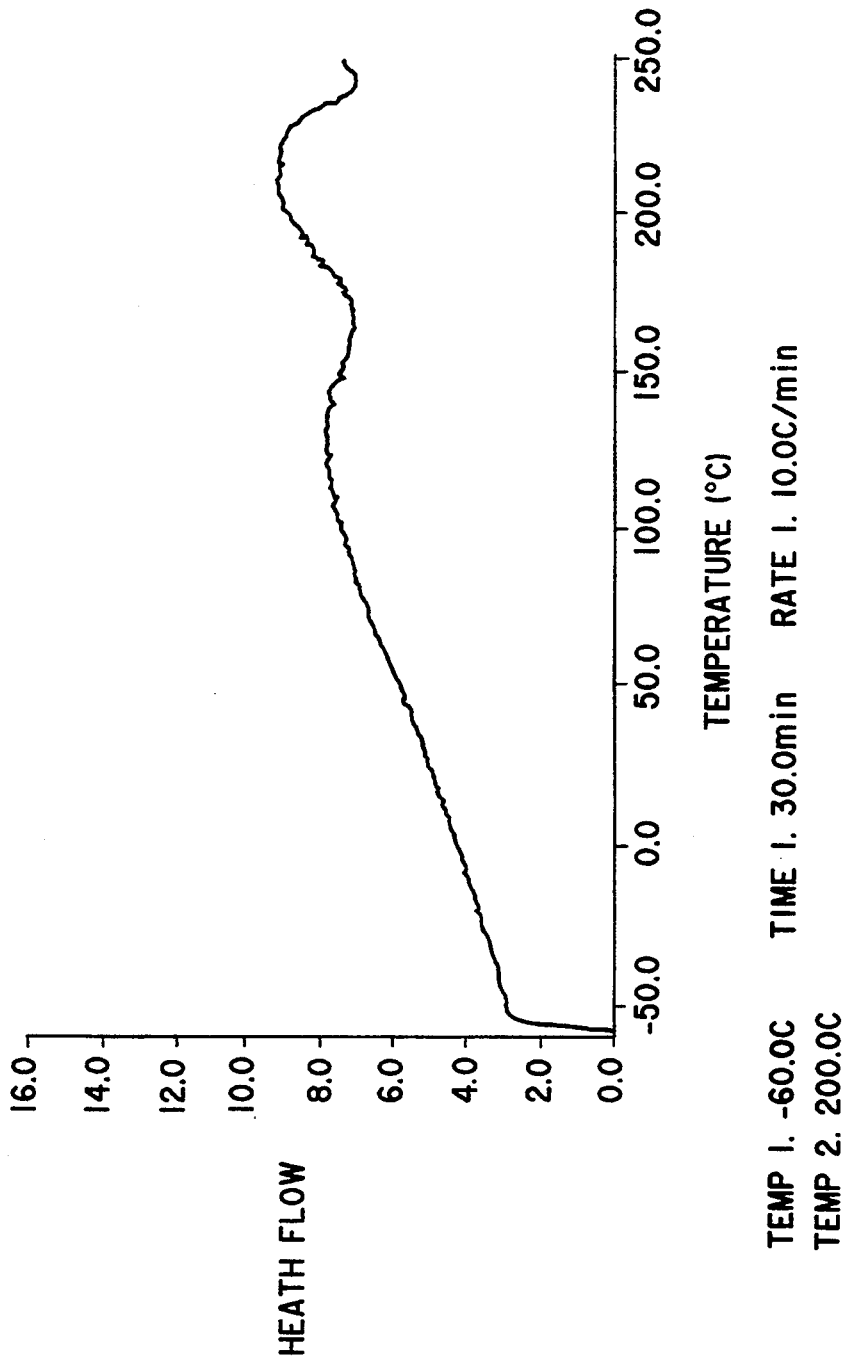
FIG. 11 is a DSC-thermogram of the complexation and degradation.

The reaction itself exhibits in measurements with a differential scanning calorimeter (DSC) an exothermic peak which represents a release of heat due to the complexation of DBSA with polyaniline (FIG. 10). This complexation occurs at elevated temperatures, usually between 100° and 200° C., depending on the association and diffusion conditions for DBSA and thus on the amount of DBSA (or on the weight ratio of PANI and DBSA). Also at elevated temperatures much above 200° C. further complexation may occur in addition to possible crosslinking, evaporation of DBSA, degradation and other reactions as seen in FIG. 11.

Figure 12:
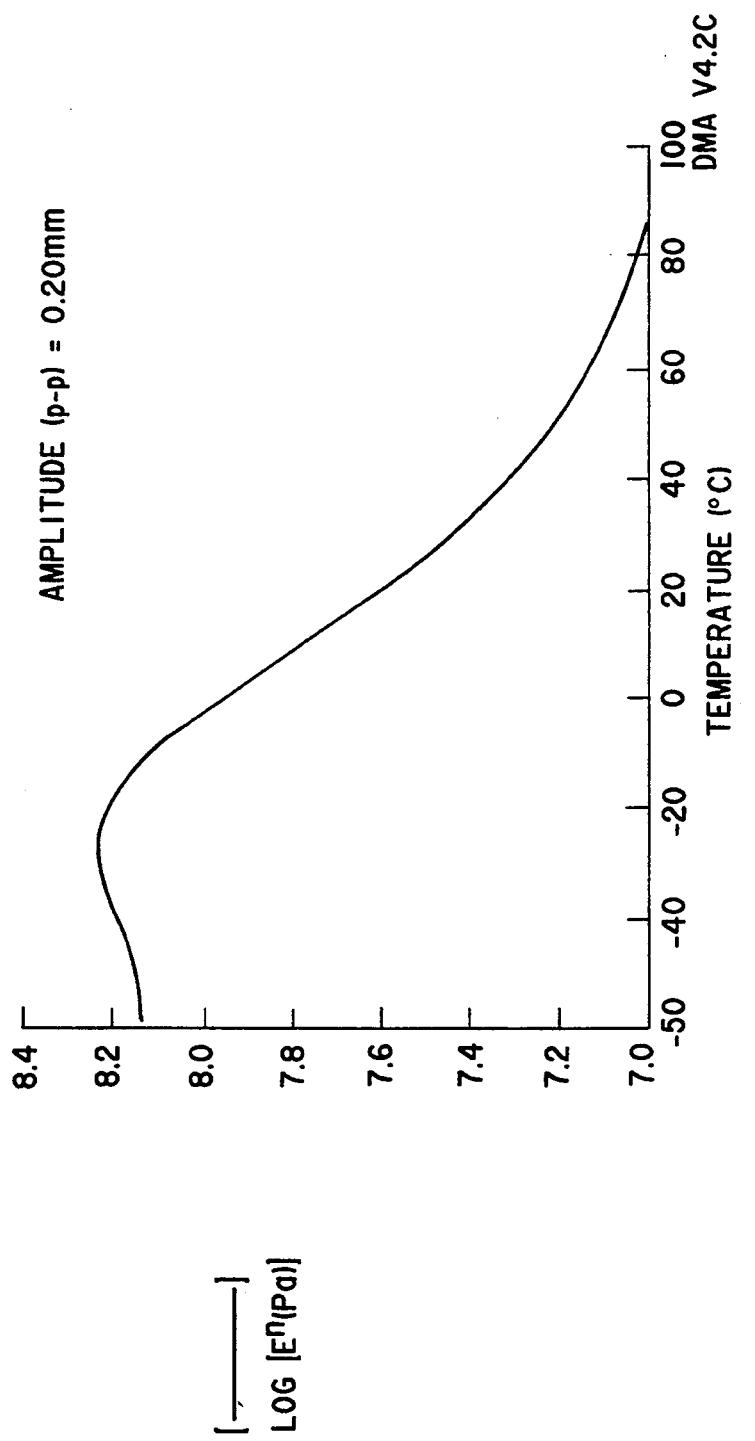
FIG. 12 is a DMA analysis curve (tan δ) on PANI/DBSA complex.

The glass transition which describes the glassy to rubbery state transition is very high for PANI due to the strong interaction between the chains and due to the rigidity of this conjugated polymer. The complexation with this alkylated protonic acid decreases the interaction between the chains and increases the entropy of the system decreasing the glass transition to about −20° C. as shown in FIG. 12, which clearly indicates the processing possibility of this complexed system.

The heat-treated reaction product or blend according to the invention is advantageously improved by blending it with a thermoplastic polymer and melt-processing these blended components into a compound material. A possible explanation for these improved processing conditions is the possible two-dimensionality of the product influencing the flow properties through this possible liquid crystallinity. An additional explanation is the earlier shown low glass transition value for the complex.

Figure 13:
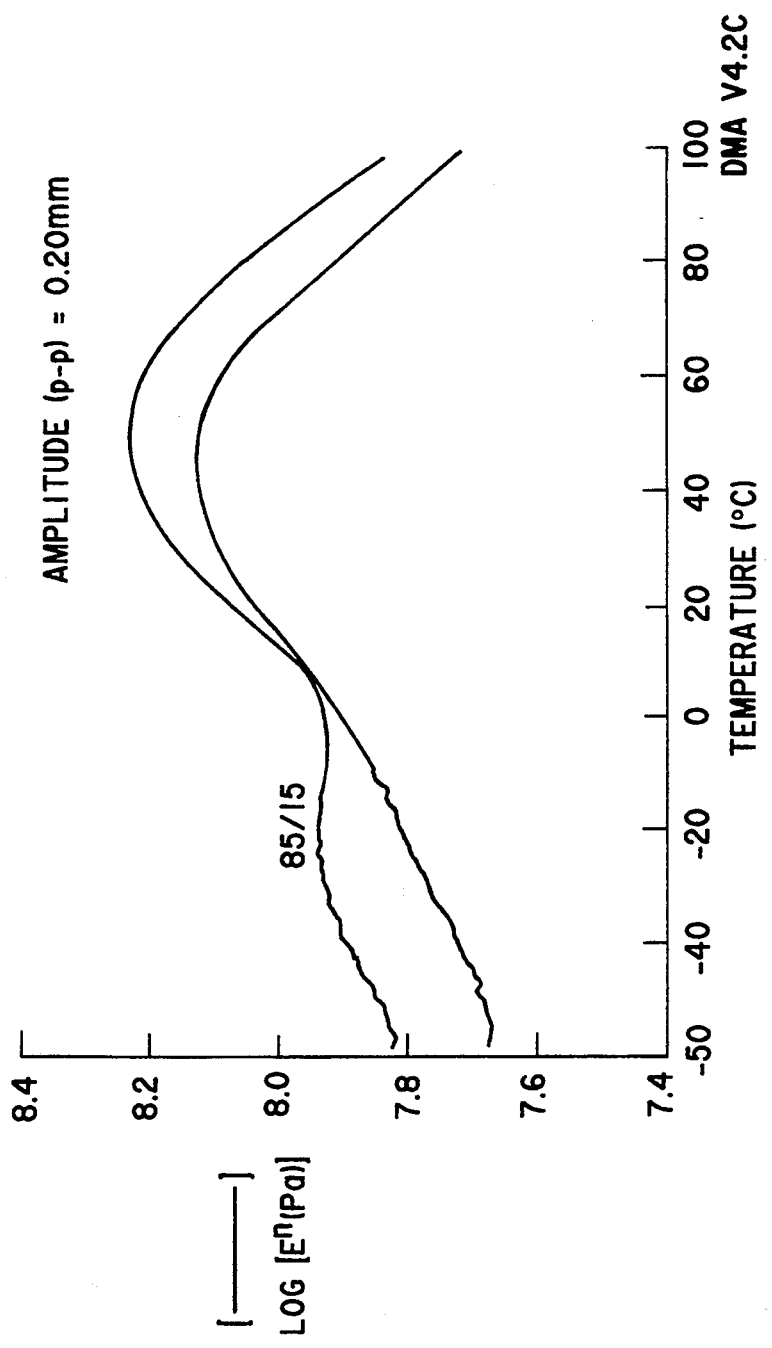
FIG. 13 is a DMA analysis curve of HDPE with PANI/DBSA complex.
Figure 23:
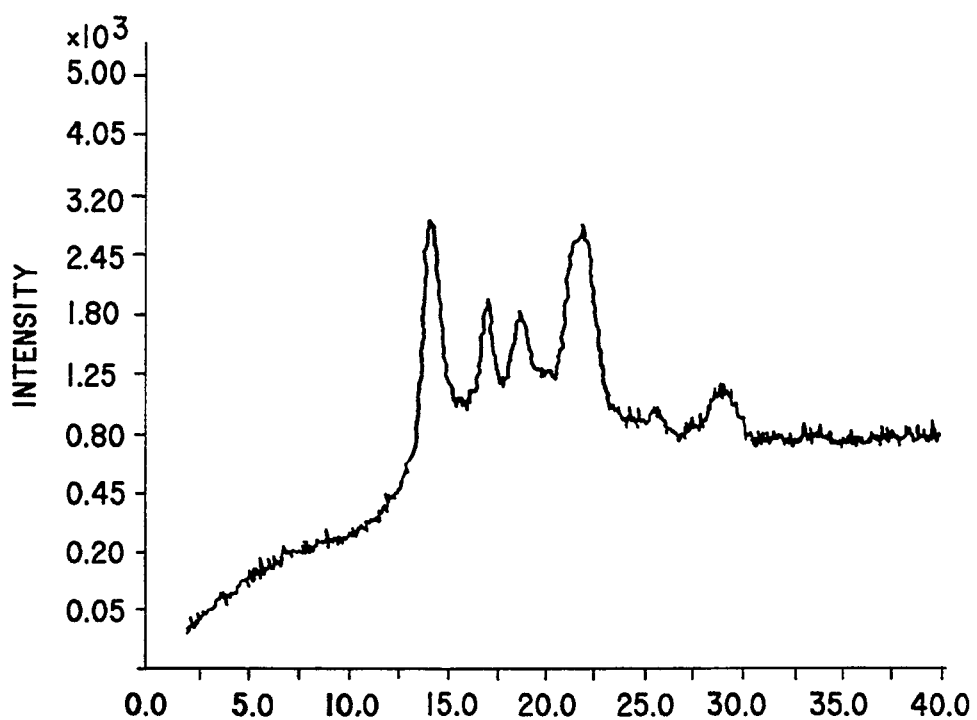
FIG. 23 is an X-ray diffraction pattern of isotactic PP with PANI/DBSA.
Figure 14:
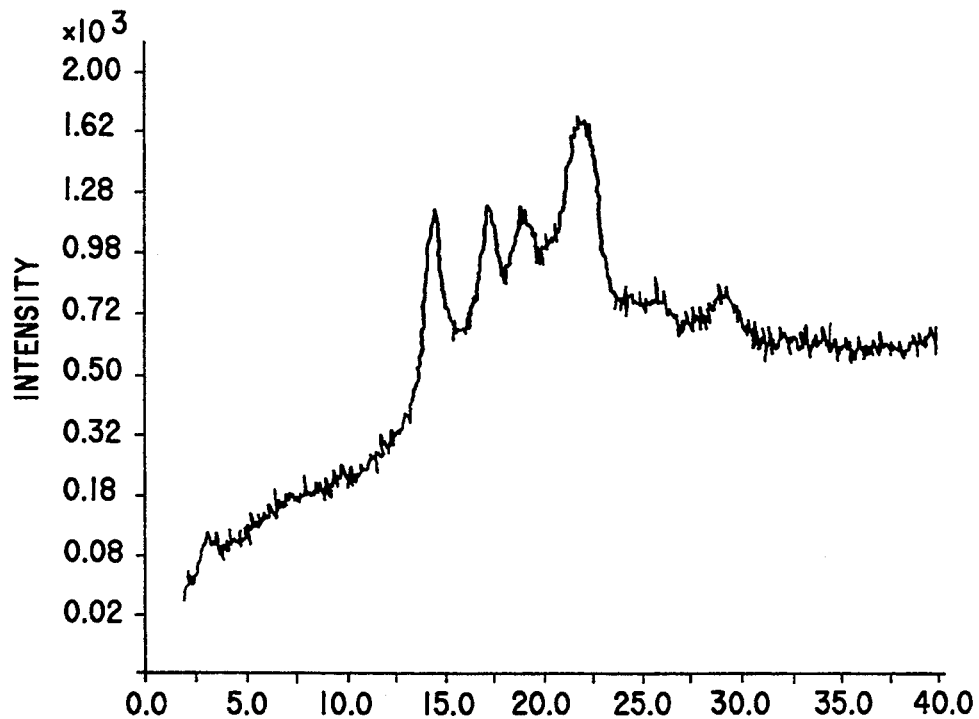
FIG. 14 is an X-ray diffraction pattern of isotactic PP with PANI/DBSA (15%).
Figure 15:
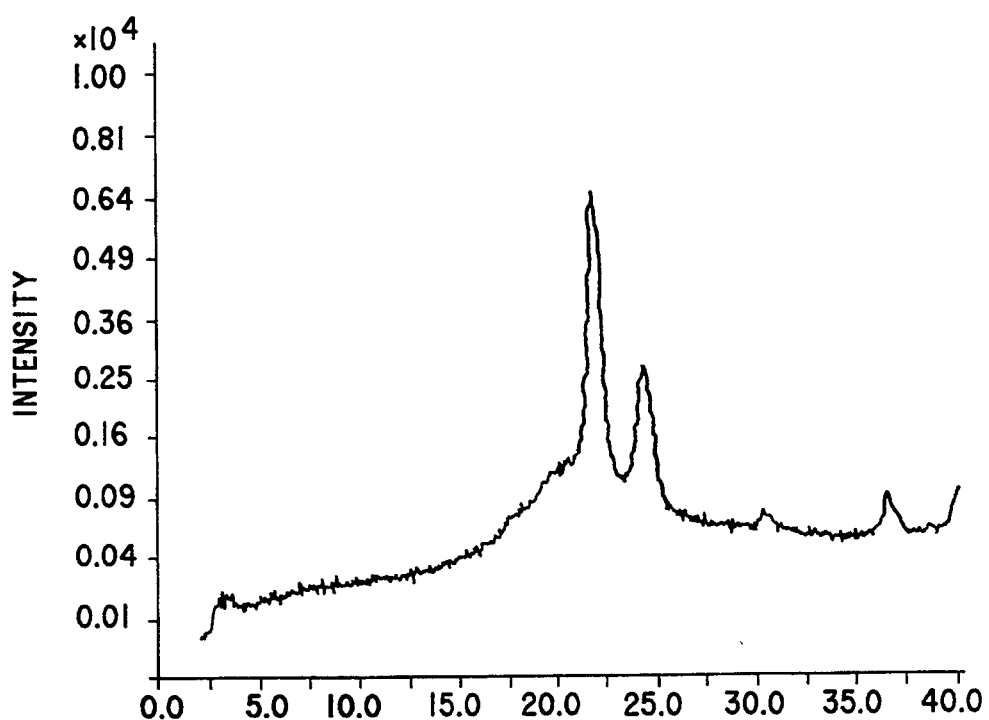
FIG. 15 is an X-ray diffraction pattern of isotactic PP with PANI/DBSA (33 %).
Figure 16:
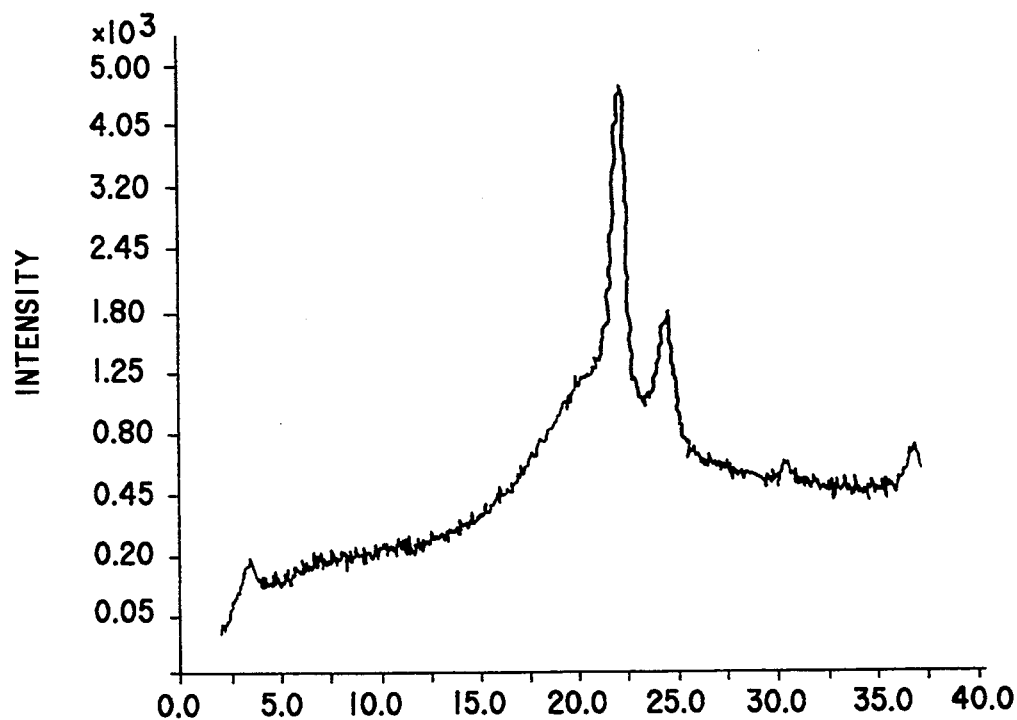
FIG. 16 is an X-ray diffraction pattern of PE with PANI/DBSA.
Figure 17:
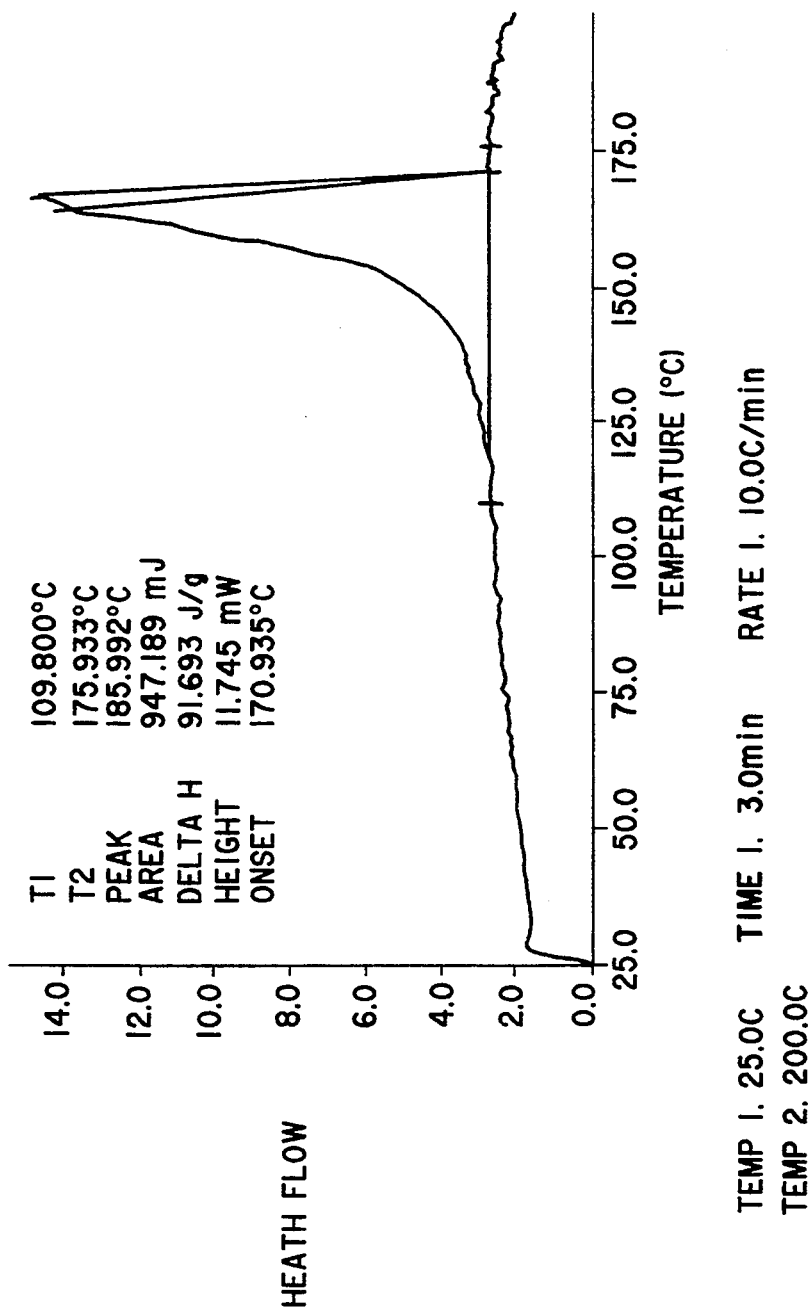
FIG. 17 is a DSC thermogram of isotactic PP.
Figure 18:
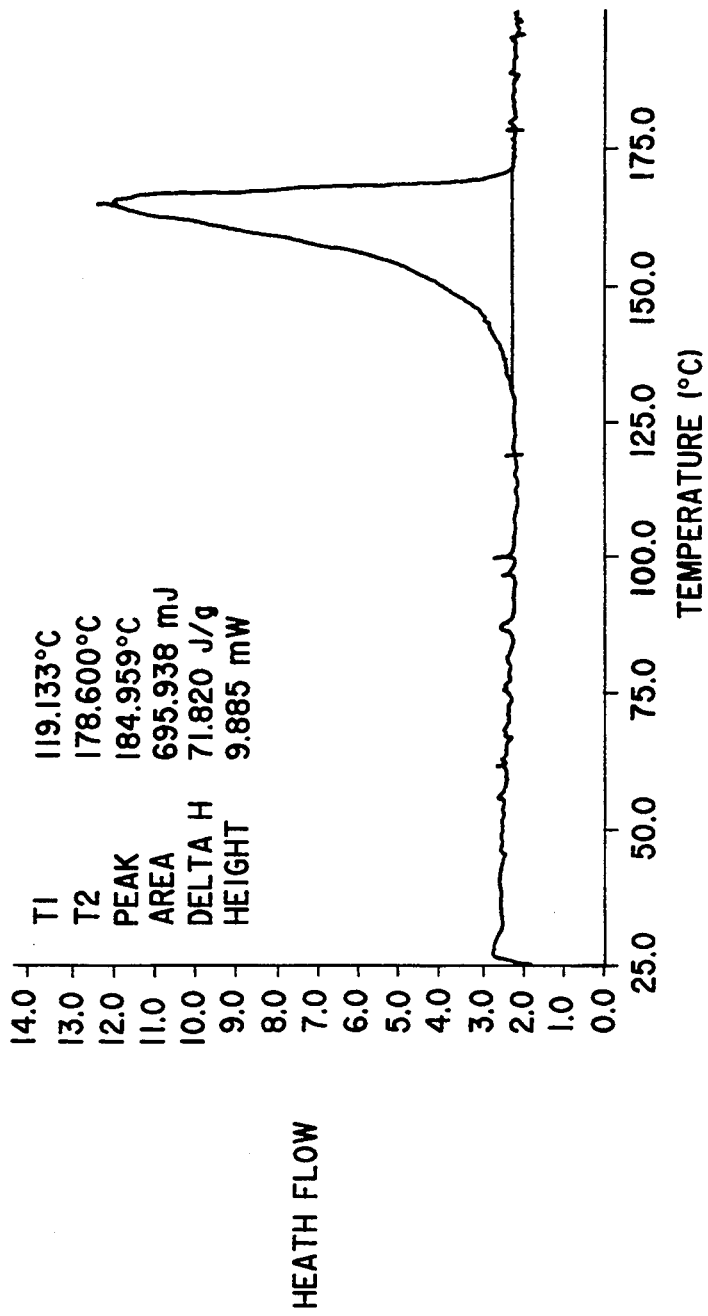
FIG. 18 is a DSC thermogram of isotactic PP with PANI/DBSA.
Figure 19:
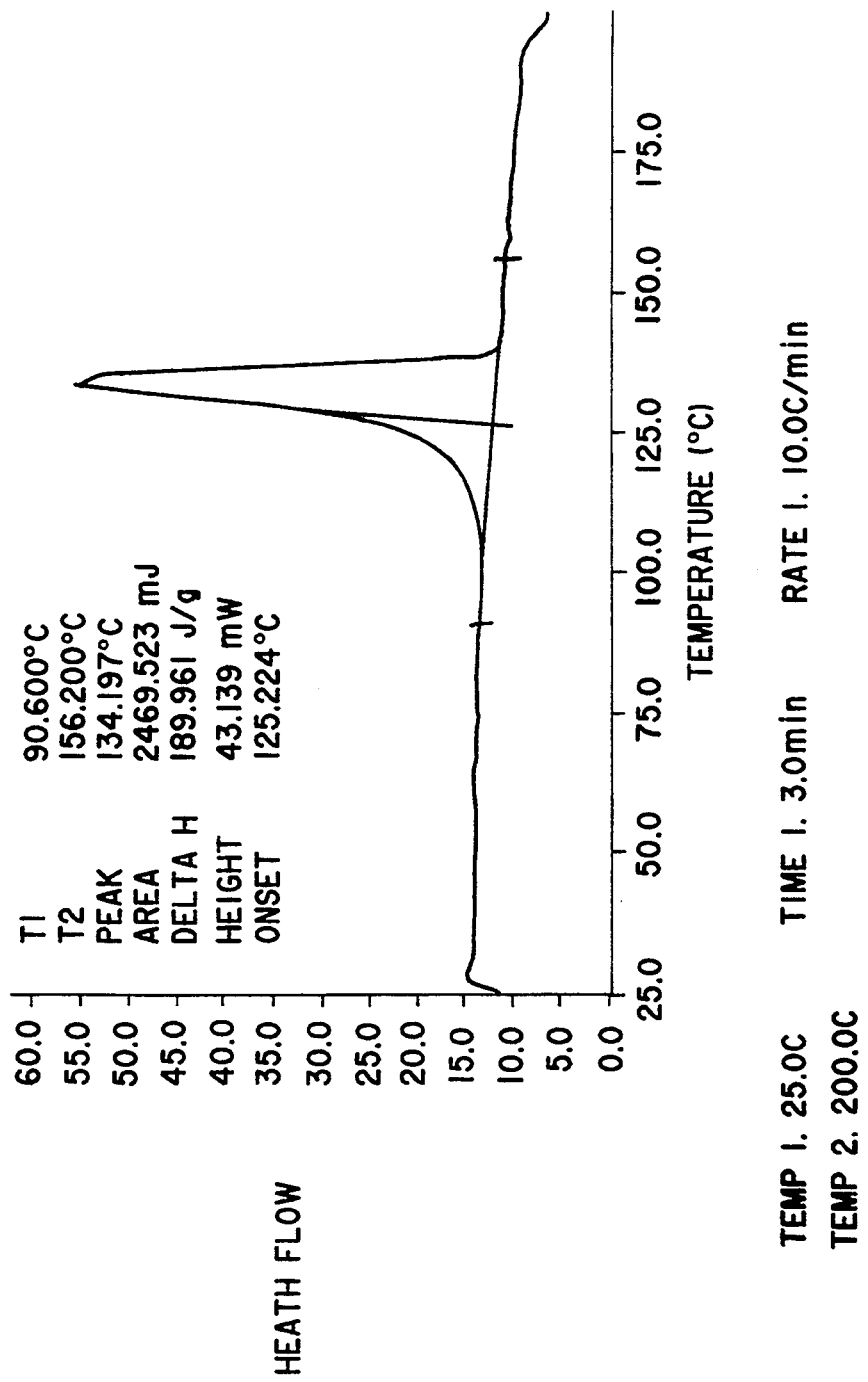
FIG. 19 is a DSC thermogram of HDPE.
Figure 20:
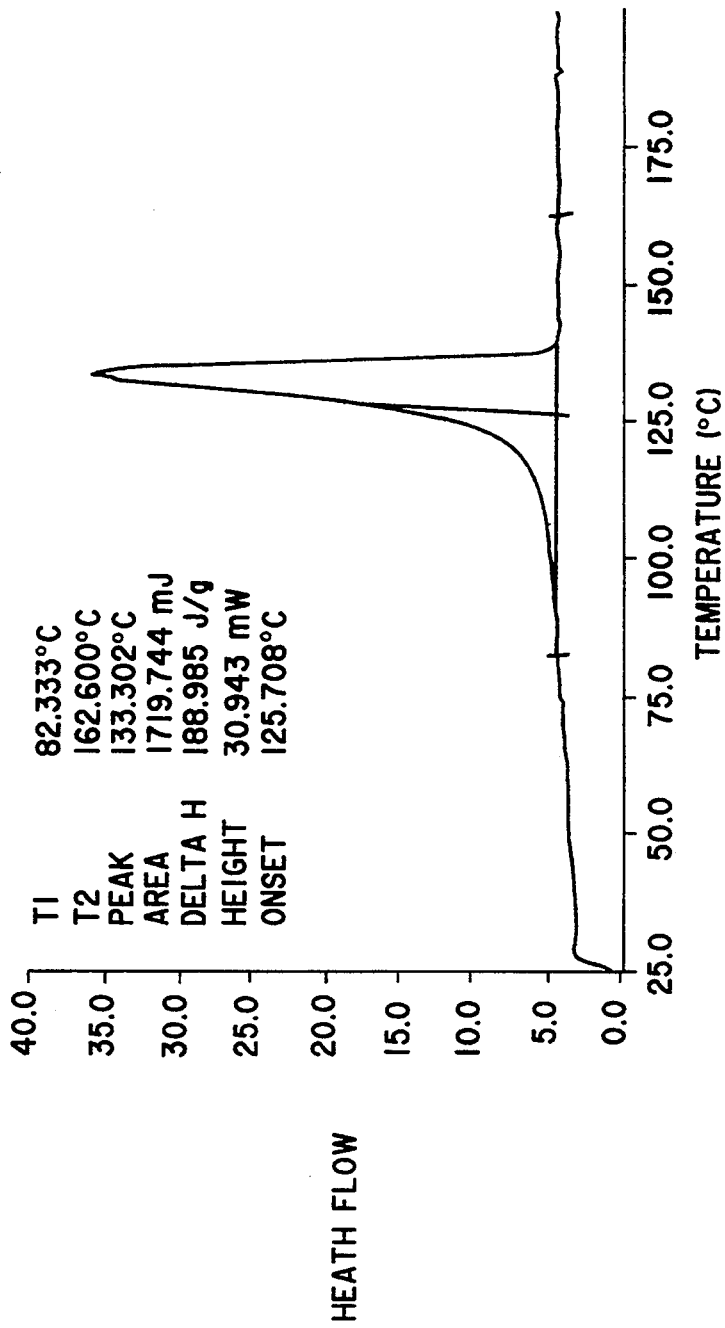
FIG. 20 is a DSC thermogram of HDPE with PANI/DBSA.
Figure 21:
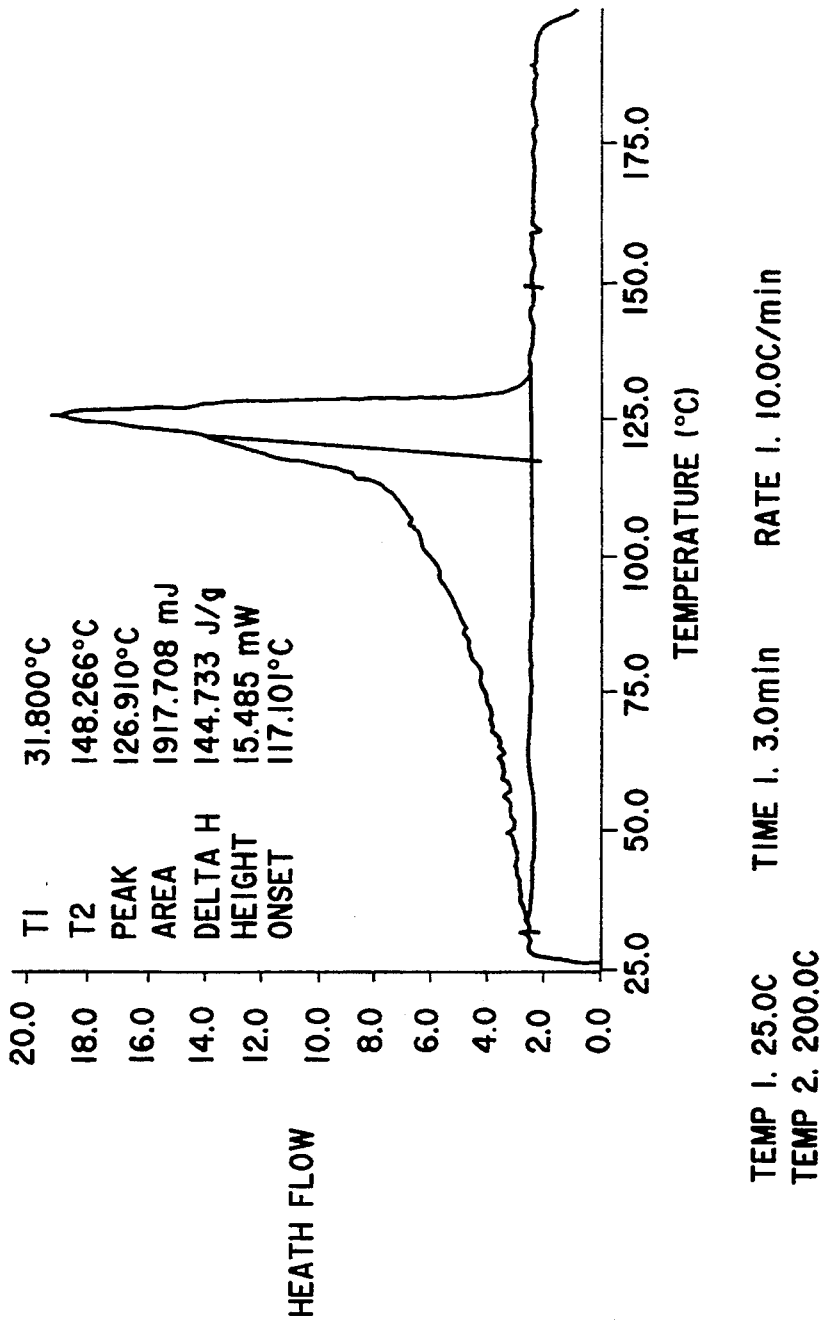
FIG. 21 is a DSC thermogram of LDPE.
Figure 22:
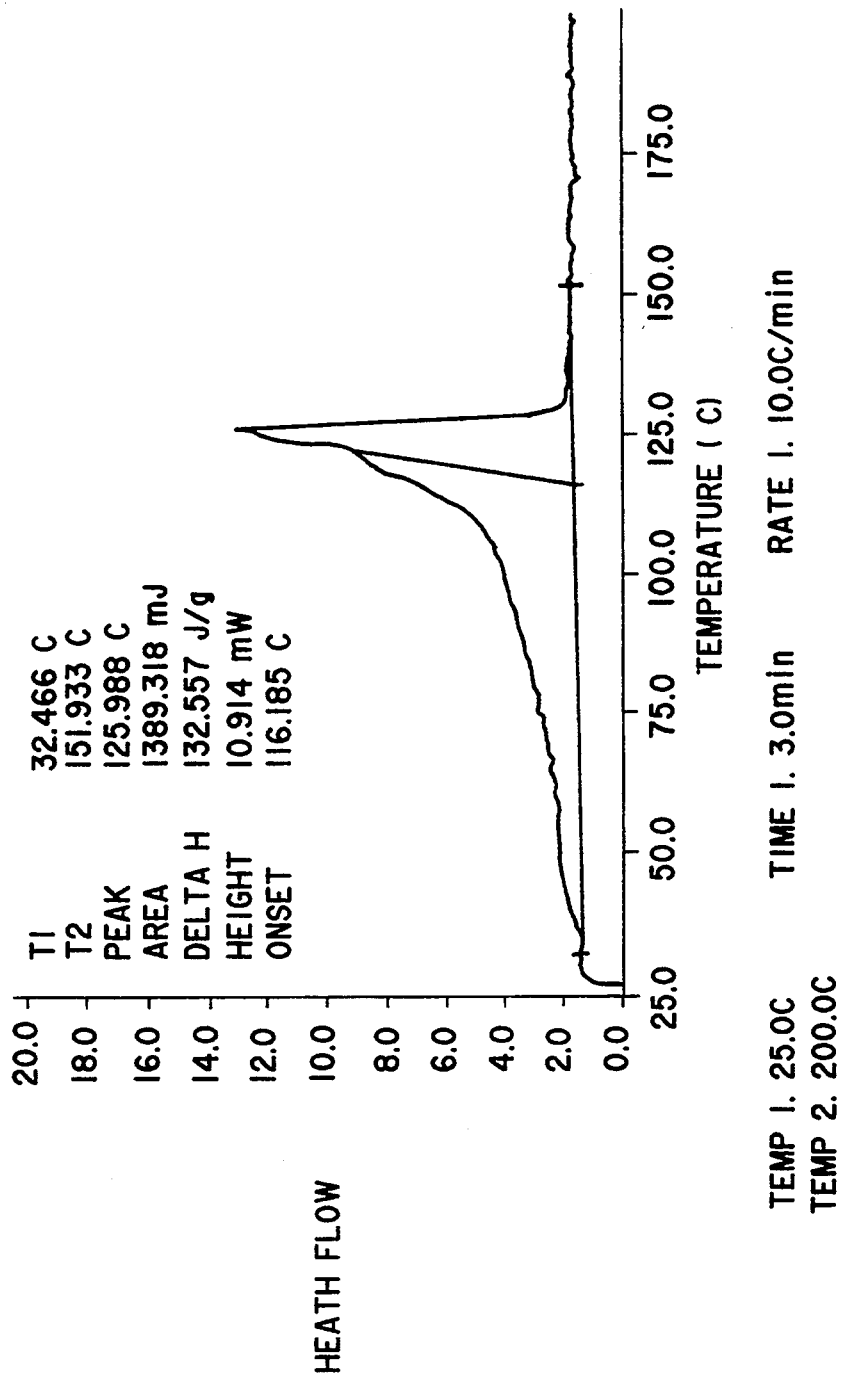
FIG. 22 is a DSC thermogram of LDPE with PANI/DBSA.
Figure 24:
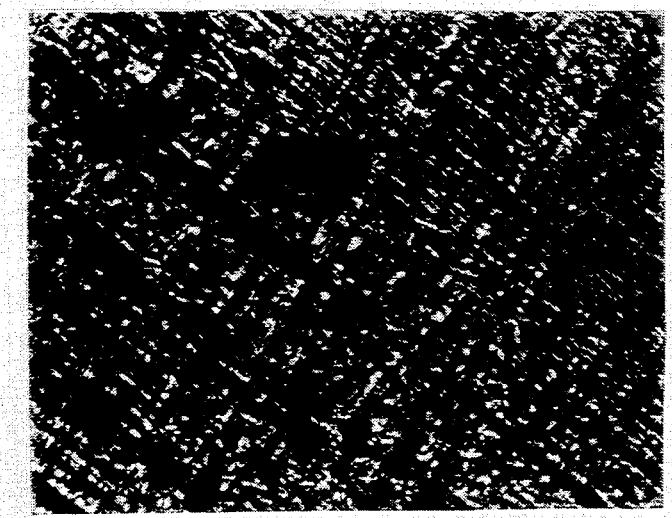
FIG. 24 is an optical micrograph of a PP+sample 1.
Figure 25:
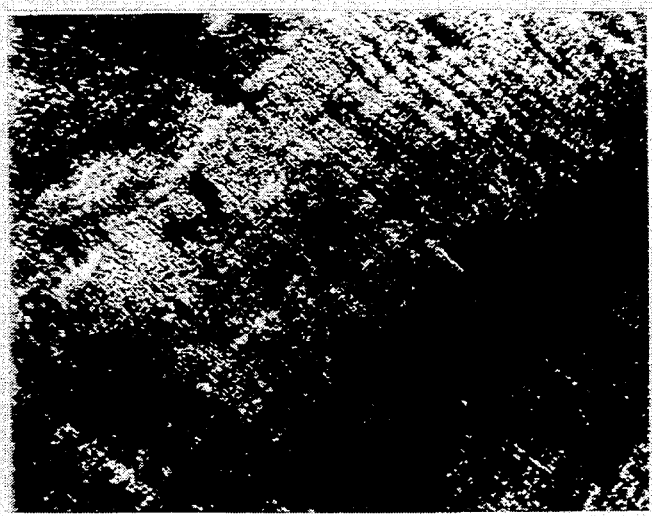
FIG. 25 is an optical micrograph of a PP+PANI/DBSA rotating the polarizer 10°.
Figure 26:
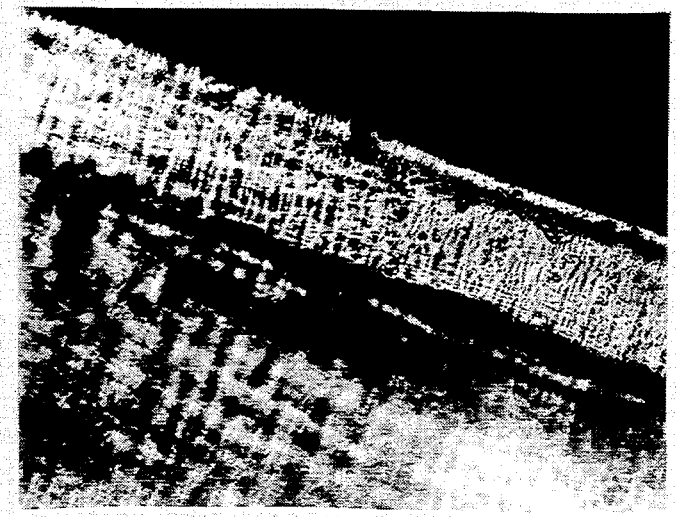
FIG. 26 is an optical micrograph of a PP+PANI/DBSA directed to the surface layer.
Figure 27:
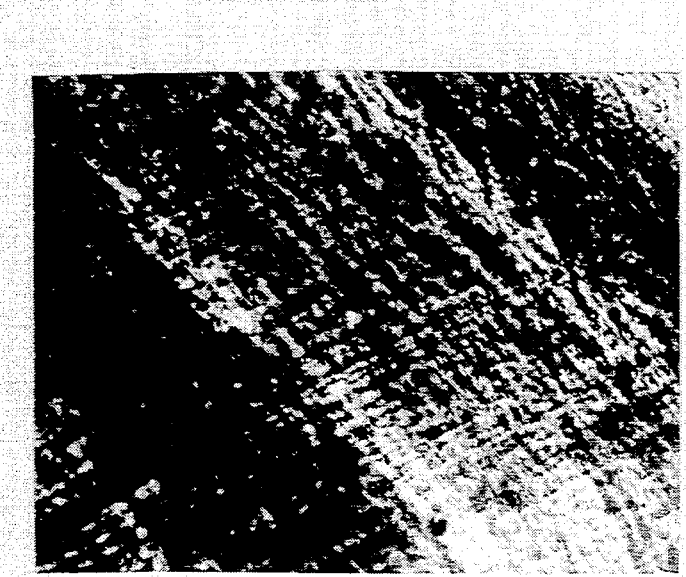
FIG. 27 is an optical micrograph of a PP+PANI/DBSA at 100° C.
Figure 28:
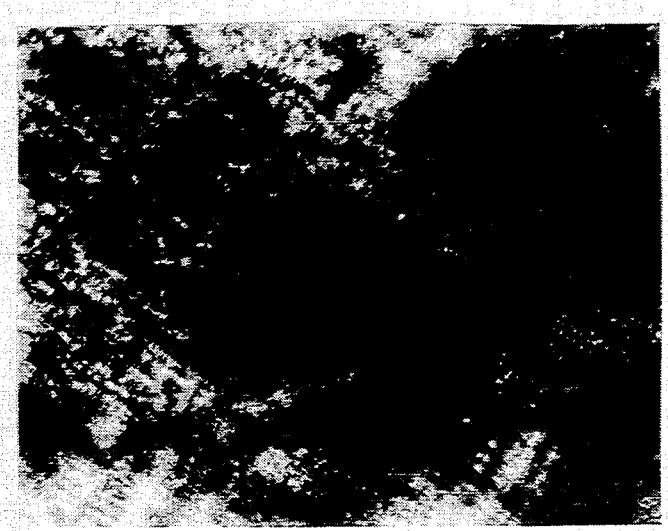
FIG. 28 is an optical micrograph of a PP+PANI/DBSA at 150° C.
Figure 29:
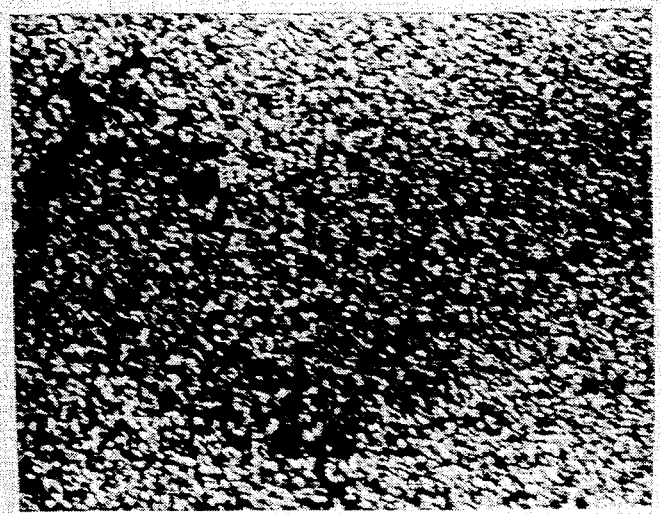
FIG. 29 is an optical micrograph of a PP+PANI/DBSA after heating to 170° C.
Figure 30:
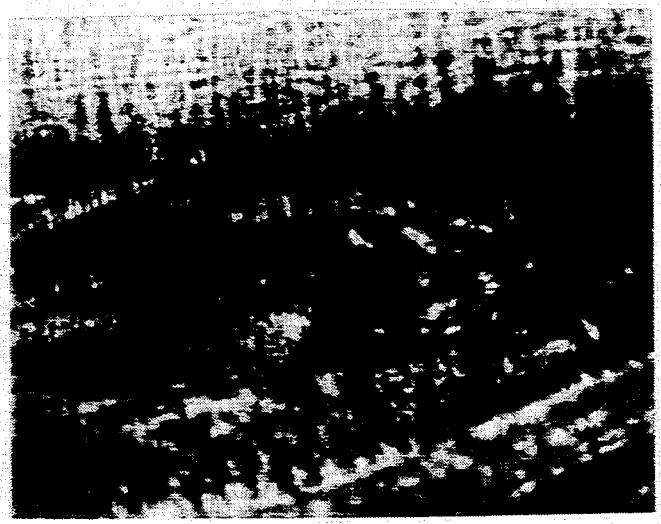
FIG. 30 is an optical micrograph directed to the layer of HDPE+PANI/DBSA.
Figure 31:
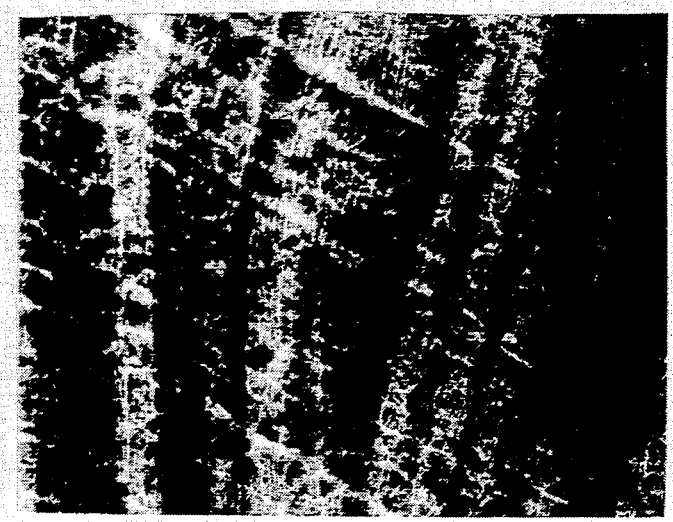
FIG. 31 is an optical micrograph of HDPE+PANI/DBSA at 120° C.
Figure 32:
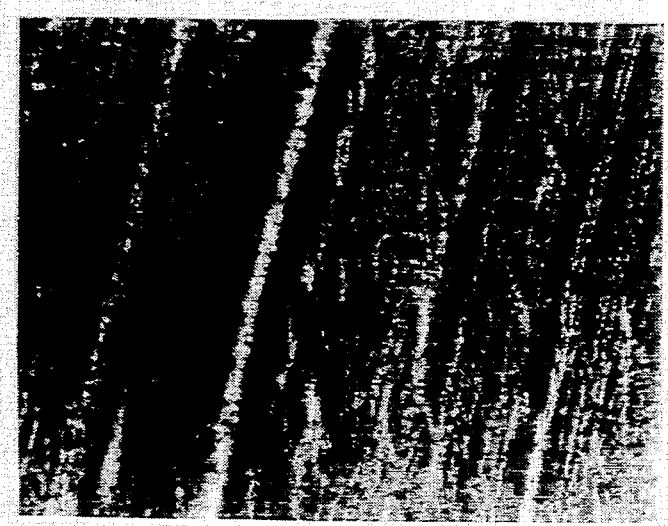
FIG. 32 is an optical micrograph of LDPE+PANI/DBSA at an elevated temperature.
Figure 33:
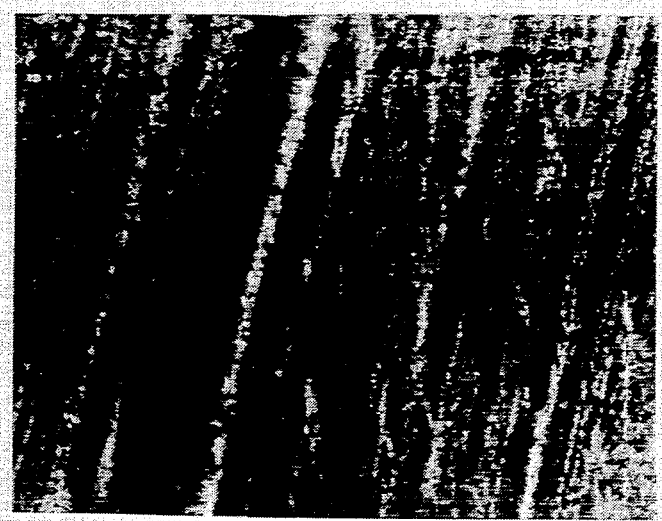
FIG. 33 is another optical micrograph of LDPE+PANI/DBSA at an elevated temperature.

According to the embodiment of this invention, the compound material can be either completely dispersed in the matrix polymer, partially phase separated or even dissolved (miscible) with the matrix polymer. Examples of complete dispersion or partial phase separation can be indicated by the two separate glass transitions as seen in FIG. 13, and by the X-ray diffraction spectra (FIGS. 14, 15 and 16) which all show the ordered regions for the both components. The miscibility can be analyzed from the melting point depression data in FIGS. 17–22, from the X-ray diffraction data (FIG. 23) which does not show any order for the compound material indicating the high degree of dissolution and from the optical micrographs (FIGS. 24–33) which show homogeneous phase structures. It is not the intention to restrict the extent of possible morphologies but to prove that the compound material can be mixed in various degrees of mixing depending on the mixing conditions.

The composition not containing a separate thermoplastic component preferably has an electrical conductivity of at least $10^{-6}$ S/cm, more preferably at least $10^{-3}$ S/cm and most preferably at least 1 S/cm. The compound material containing a separate thermoplastic component preferably has an electrical conductivity of at least $10^{-9}$ S/cm.

EXAMPLES

In the following the invention is described in greater detail with the help of exemplifying tests. Each example comprises three test series, of which the first was not representative of the method according to the invention.

The first step in all tests was to prepare a dispersion of polyaniline and dodecylbenzenesulfonic acid. This dispersion was blended with a matrix plastic, after which a solid test piece containing the conducting polymer was shaped. The test piece appearance, i.e., its homogeneity, was evaluated visually and the electrical conductivity of the test piece was measured.

The conducting polymer used in the tests was the emeraldine base form of polyaniline.

Two different grades of dodecylbenzenesulfonic acid were used as the doping agent (that is, counter ion). One of the doping agents was purified Tokyo Kasei grade and the other a commercial grade known by the brand name SULFOSOFT.

The thermoplastic polymer component of the melt-processed compound material, that is, the matrix plastic into which the doped polyaniline was blended was, i.a., polystyrene, soft PVC and high density polyethylene (HDPE).

Testing equipment zenesulfonic acid was mixed thoroughly by applying several plunger strokes of the mixing apparatus.

TABLE 1

| | | | Processing condition in a mixing apparatus according to Method A | | | | |
|---|---|---|---|---|---|---|---|
| Test no. | PANI + DBSA [g] | Matrix plastic [g] | Weight ratio PANI/ DBSA | T [°C.] | Blend- ing cycles | Measured resis- tance | Weight ratio (PANI + DBSA)/ polymer |
| 1 | 9 | 4 PS | 1:4 | 180 | 20 | 0.2 kΩ | 2.25 |
| 2 | 4.5 | 8 PS | 1:7 | 200 | 20 | 0.4 kΩ | 0.56 |
| 3 | 1.2 | 10.8 PS | 1:4 | 180 | 20 | 235 MΩ | 0.11 |
| 4 | 4 | 8 PS | 1:4 | 180 | 10 | 8 kΩ | 0.50 |
| 5 | 4 | 8 PS | 1:6 | 180 | 10 | 70 kΩ | 0.30 |
| 6 | 4 | 8 PS | 1:3 | 180 | 10 | 3 kΩ | 0.50 |
| 7 | 4 | 8 PS | 1:2 | 180 | 10 | 70 kΩ | 0.50 |
| 8 | 4 | 8 PS | 1:4 | 180 | 10 | 1.5 kΩ | 0.50 |
| 9 | 4 | 8 PS | 1:4 | 200 | 10 | 12 kΩ | 0.50 |
| 10 | 4 | 8 PS | 1:4 | 200 | 10 | 15 MΩ | 0.50 |
| 11 | 4 | 8 PS | 1:4 | 170 | 5 | 1 kΩ | 0.50 |
| 12 | 4 | 8 LDPE | 1:4 | 170 | 10 | 40 MΩ | 0.50 |
| 13 | 4 [1] | 8 PS | 1:4 | 170 | 5 | 6 kΩ | 0.50 |
| 14 | 4 [1] | 8 PS | 1:3 | 170 | 5 | 10 kΩ | 0.50 |
| 15 | 4 [1] | 8 PS | 1:4 | 170 | 5 | 4 kΩ | 0.50 |
| 16 | 4 [1] | 8 PS | 1:3 | 170 | 5 | 7 kΩ | 0.50 |
| 17 | 4 [1] | 8 PS | 1:1 | 170 | 5 | 140 kΩ | 0.50 |

Legend of abbreviations:
PANI = polyaniline,
DBSA = dodecylbenzenesulfonic acid, the doping agent,
PS = polystyrene,
T = temperature,
LDPE = polyethylene,
[1] = polyaniline was dried for 3 h at 90° C.

The processing tests were performed using a testing equipment. modified from a FERROMATIK FR-40 injection molding machine which is particularly suited for mixing and melt-processing of small polymer batches weighing approx. 10 g, said machine comprising a mixing screw and a feed plunger connected to the screw.

The resistance of the test pieces was measured by attaching test clamps of a multimeter to the ends of the pieces. The measurement results obtained by this method are correct to within an order of magnitude, yet they lack full precision, since the contact resistance between the test clamp and the plastic test piece varies during the measurement and from measurement to measurement. The measurements were, however, performed in a consistent manner in which the test clamp was manually pressed in place by simultaneously rotating the clamp. After this, the test piece was left to rest undisturbed on a table with all sensors attached, and the resistance was recorded after the meter reading was stabilized. Two-point measurement was applied to test pieces 53 and 54 only.

COMPARATIVE EXAMPLES 1–17

METHOD A

Method A is a prior art processing method in which polyaniline, dodecylbenzenesulfonic acid and a thermoplastic polymer, that is, the matrix plastic in granulate or powder form, are directly and thoroughly mixed so as to obtain the final test piece.

The mixing ratios employed in the tests are given in Table 1. The components used in these tests were separately weighed into a vessel in which the premixing (preprotonation) was performed prior to transfer the premixture into the mixing apparatus.

The premixed blend of polyaniline and dodecylbenzenesulfonic acid was combined with the matrix plastic and transferred into the mixing apparatus. In the mixing apparatus polyaniline preprotonated with dodecylben- In terms of resistance measurement, the test blends no. 1 and no. 2 gave the best results with resistances in the order of 0.2 to 0.4 kΩ. The surface quality and appearance in both of these two test pieces was approximately equal. However, test piece no. 2 exhibited a slightly greasier feel than test piece no. 1. Both test pieces showed prominent flow marks. In test no. 3, a blend was first prepared containing 1 part per weight of PANI and 4 parts per weight of DBSA. The highest quality was found in test piece no. 5, 70 kΩ, containing 30% of the (1:4 PANI/DBSA) mixture of the total blend volume. When the PANI/DBSA mixtures were prepared in advance for tests performed next day, such test pieces had much lower conductivity than comparable test pieces produced in the single run the day before. The mixed blends were stored in an open vessel at approx. 20° C. The test pieces showed prominent flow marks.

Resistance measurements indicate that the best results were achieved using PANI/DBSA weight ratios (1:4) and (1:3), the concentration of the PANI/DBSA in the compound being 30% by weight (the 1:1 molar ratio corresponds to 1:3.57 weight ratio). Tests no. 8 through 11 indicated that the resistance increases as the mixing time is prolonged. Similarly, temperature elevation from 170° C. to 200° C. also increases the resistance. All test pieces prepared according to Method A showed prominent flow marks and blisters.

The prior-art blending method A, in which the premixed PANI/DBSA blend or reaction product was not heat-treated hampered by, i.a. , non-reproducable conductivity values irregular surface quality and a paste-like form; and furthermore, the "liquid" complex is difficult to process in commercially available machines. The effect of further drying was examined by a later test series according to Method A. The obtained results were slightly better, but still showed prominent flow marks.

EXAMPLES 1-45
METHOD B

According to Method B, a preprotonated polyaniline, that is, the reaction product or blend was first prepared from polyaniline and dodecylbenzenesulfonic acid. This was next processed into a solid piece by strong mechanical mixing and possible injection molding together with a granulate or powder of the matrix plastic. The resulting compound was then ground into a granulate or powder in a separate apparatus for the actual melt-processing stage. The method requires an extremely dry PANI, DBSA and accurate control of the premixing ratio. The mixing ratios, temperatures during mixing and numbers of mixing cycles applied in the tests are given in Tables 2 and 3. The components used in the tests were separately weighed into a vessel in which the premixing (preprotonation) was performed, prior to transferring the blend into the mixing apparatus.

another test, no. 8, was performed by mixing the crushings of the injected PANI/DBSA with a 50% proportion of polystyrene. An injection-molded piece made of this compound material had an almost perfect appearance, thereby differing from all previous results which exhibited prominent flow marks and blisters.

The resistance measurements indicated that the preinjection phase had not increased the test piece resistance in comparison with an injection-molded piece made directly from the initial components according to Method A. The solid form of the piece processed in the preinjection stage gave a clue that the material could be fed into the chamber of an injection molding machine mixed with a matrix plastic. Thus, the method seemed to facilitate injection molding of a conducting polymer in a conventional injection molding machine. On the basis of the abovedescribed facts, the method was subjected to closer examination in subsequent tests.

Test no. 21 was performed so that the injection-

TABLE 2

Processing conditions in a mixing aparatus according to Method B

| Test no. | PANI + DBSA [g] | Matrix plastic [g] | | Weight ratio PANI/DBSA | T [°C.] | Blending cycles | R | Weight ratio (PANI + DBSA)/polymer |
|---|---|---|---|---|---|---|---|---|
| 1  | 14     | —    |      | 1:4 | 170 | 5  | 200 Ω   | —    |
| 2  | 3      | 9    | PS   | 1:4 | 180 | 5  | 300 kΩ  | 0.33 |
| 3  | 3      | 9    | PS   | 1:4 | 180 | 5  | 100 kΩ  | 0.33 |
| 4  | 3.5    | 10   | PA   | 1:4 | 180 | 10 | OL      | 0.38 |
| 5  | 3.5    | 10   | PA   | 1:4 | 240 | 10 | NO TP   | 0.38 |
| 6  | 4      | 8    | PS   | 1:4 | 180 | 10 | 100 MΩ  | 0.50 |
| 7  | 4      | 8    | PS   | 1:4 | 170 | 5  | 20 kΩ   | 0.50 |
| 8  | 4 [1]  | 8    | PS   | 1:4 | 170 | 5  | 3 kΩ    | 0.50 |
| 9  | 2.6 [1]| 9.4  | PS   | 1:4 | 170 | 5  | OL      | 0.27 |
| 10 | ...    | —    |      | 1:4 | 170 |    | NO TP   | —    |
| 11 | ...    | —    |      | 1:4 | 170 | 5  | 30 kΩ   | —    |
| 12 | 4 [2]  | 8    | PS   | 1:4 | 170 | 5  | 4 MΩ    | 0.50 |
| 13 | 14     | —    |      | 1:4 | 170 | 10 | 30 Ω    | —    |
| 14 | 14     | —    |      | 1:3 | 170 | 5  | 30 Ω    | —    |
| 15 | 10 [3] | 2    | HDPE | 1:4 | 170 | 5  | 70 Ω    | 5.0  |
| 16 | 4 [4]  | 8    | PS   | 1:4 | 170 | 5  |         | 0.50 |
| 17 | 14     | —    |      | 1:3 | 185 | 5  | 30 kΩ   | —    |
| 18 | 14     | —    |      | 1:3 | 200 | 5  | 30 kΩ   | —    |
| 19 | 4 [5]  | 8    | PS   | 1:3 | 200 | 5  | 40 kΩ   | 0.50 |
| 20 | 2 [5]  | 10   | PS   | 1:3 | 200 | 5  | OL      | 0.20 |
| 21 | 4 [6]  | 8    | PS   | 1:3 | 170 | 5  | 5 kΩ    | 0.50 |

Legend of abbreviations:
PANI = polyaniline,
DBSA = dodecylbenzenesulfonic acid (purified grade),
PS = polystyrene,
T = temperature,
R = measured resistance,
LDPE = polyethene,
HDPE = polyethene,
PA = polyamide,
OL = outside meter scale,
NO TP = no testpiece,
[1] = mixture of test no. 1,
[2] = mixture of test no. 11,
[3] = mixtures of tests no. 11 and 13,
[4] = mixture of test no. 15,
[5] = mixture of test no. 18, and
[6] = mixture of test no. 17 was dried for 1 h at 60° C.

The test injection piece no. 1 was made of a plan PANI/DBSA 1:4 mixture. Unexpectedly the syrup-like initial mixture was found to convert under elevated temperature and pressure into a hard, solid material resembling a crayon. Since the sample had a resistance as low as approx. 200 Ω and was remeltable by heat, molded piece no. 17 made of the compounded material was held for approx. 1 h at 60° to 80° C. This injection-molded piece, which was made by blending into a PS matrix, was the best in the series, although not entirely free of surface defects.

TABLE 3

Processing conditions in a mixing apparatus according to Method B, continuation of Table 2

| Test no. | PANI + DBSA [g] | Matrix plastic [g] | Weight ratio PANI/DBSA | T [°C.] | Blending cycles | R | Weight ratio (PANI + DBSA)/polymer |
|---|---|---|---|---|---|---|---|
| 22 | 4 | — | 1:4 | 170 | 5 | 50 Ω | — |
| 23 | 14 | — | 1:2.5 | 170 | 5 | 100 Ω | — |
| 24 | 13 | — | 1:2.5 | 185 | 10 | 400 Ω | — |
| 25 | 13 | — | 1:2.5 | 185 | 5 | 700 Ω | — |
| 26 | 13 | — | 1:3 | 170 | 5 | 200 Ω | — |
| 27 | 13 | — | 1:3 | 160 | 5 | 55 Ω | — |
| 28 | 13 | — | 1:4 | 160 | 5 | 100 Ω | — |
| 29 | 13 | — | 1:4 | 170 | 5 | 50 Ω | — |
| 30 | 4 [1] | 8 PS | 1:2.5 | 170 | 5 | 15 kΩ | 0.50 |
| 31 | 4 [2] | 8 PS | 1:2.5 | 170 | 5 | 0.3 MΩ | 0.50 |
| 32 | 4 [3] | 8 PS | 1:3 | 170 | 5 | 5 kΩ | 0.50 |
| 33 | 4 [4] | 8 PS | 1:3 | 170 | 5 | 4 kΩ | 0.50 |
| 34 | 14 | — | 1:3 | 170 | 10 | 100 Ω | — |
| 35 | 14 | — | 1:3 | 170 | 10 | 100 Ω | — |
| 36 | 14 | — | 1:3 | 175 | 10 | 400 Ω | — |
| 37 | 14 | — | 1:3 | 160 | 10 | 200 Ω | — |
| 38 | 14 | — | 1:3 | 150 | 10 | 100 Ω | — |
| 39 | 14 | — | 1:3 | 160 | 10 | 100 Ω | — |
| 40 | 4 [5] | 8 PS | 1:4 | 180 | 10 | 2 kΩ | 0.50 |
| 41 | 3.5 [5] | 8.5 PS | 1:4 | 180 | 10 | 8 kΩ | 0.29 |
| 42 | 2.5 [5] | 9.5 PS | 1:4 | 180 | 10 | 40 kΩ | 0.26 |
| 43 | 3 [5] | 9 PS | 1:4 | 180 | 10 | 80 kΩ | 0.33 |
| 44 | 3 [6] | 9 PS | 1:3 | 180 | 10 | 100 MΩ | 0.33 |
| 45 | 3.7 [7] | 8.3 LDPE | 1:3 | 180 | 10 | 200 kΩ | 0.44 |

Legend of abbreviations:
PANI = polyaniline,
DBSA = dodecylbenzenesulfonic acid (commercial Sulfosoft grade),
PS = polystyrene,
T = temperature,
R = measured resistance,
LDPE = low-density polyethene,
[1] = mixture of test no. 23,
[2] = mixture of test no. 24,
[3] = mixture of test no. 27,
[4] = mixture of test no. 26,
[5] = mixtures of tests no. 41 through 43,
[6] = mixture of test no. 44.

In these tests a commercial grade of dodecylbenzenesulfonic acid, Sulfosoft, was employed for the first time. Preprotonated PANI/DBSA blends are prepared in weight ratios of 1:2.5, 1:3, 1:4, 1:5 and 1:6. The blends were stored for 3.5 days at 30° C.

The test series 22 through 29 were performed by compression from the different PANI/DBSA blends. The final results were aimed at a solid product without a tacky or wetted surface that could be ground into small granules or powder. Comparison of the resistance and tackiness of the different compressed products indicates that tackiness is increased and resistance lowered with an increasing content of DBSA. Injection moldings made with PS from these compressed pieces in tests no. 30 through 33 indicated that the resistance in the final products made from a "tacky" compressed initial piece was also slightly lower in the final product than in a piece made starting from a hard initial piece, e.g., in test no. 24 (1:2.5). The surface quality of these pieces was, however, imperfect. Tests no. 34 through 45 corroborate the abovedescribed results.

EXAMPLES 46–68

METHOD C

The best results Here obtained using Method C. In this method the mold and the mixing apparatus were kept separate, whereby one end of the mixing cylinder and the screw end were visible. The temperature was controlled to desired level prior to starting a test. The preprotonated PANI/DBSA blend to be solidified (prepared with weight ratios of 1:2, 1:3, 1:4 and 1:5, which all could be solidified) was placed in the feed cylinder whose plunger speed was set to a level suitable for granulation. The rotational speed of the screw in the mixing barrel was set to a desired speed (below 300 r/min in the tests).

The preparation of the solid complex takes place by compressing the preprotonated PANI/DBSA from the feed cylinder via the mixing barrel. The dry complex exits from the open end of the mixing barrel directly into a storage vessel in a form which can be a powder, comprised by larger particles or in the shape of a continuous band. The solid PANI/DBSA product or masterbatch can be mechanically mixed with a granulate matrix polymer for melt-processing.

For injection molding tests a solid PANI/DBSA product was prepared. The preprotonation of the product was performed as follows: The weight ratios of the PANI/DBSA blends were 1:3 =III, 1:4=IV, 1:5=V. The other operating parameters of the apparatus were:
Mixing barrel temperature: 180° C.
Rotational speed of screw: 180 r/min.
The measured pass-through times and granules shapes were:
Run III: 3.3 g/min, dry powdery form, some larger granules,
Run IV: 5.5 g/min, oblong granules with no tendency to adhere,
Run V: 4.5 g/min, oblong granules with a tendency to adhere.
The granules were stored in plastic jars.

The mixing ratios, mixing temperatures and mixing cycles employed in the tests according to Method C are given in Tables 4 and 5. Table 4 lists the blends and treatment conditions for the preprotonated PANI/DBSA blend and Table 5 lists the mixing conditions for products made thereof with a matrix polymer.

TABLE 4

Processing condition for preprotonated PANI/DBSA blend in a mixing apparatus according to Method C

| Test no. | Temperature [°C.] | Screw rotation speed [r/min] | Vertical feed rate [g/min] | Weight ratio PANI/DBSA |
|---|---|---|---|---|
| I | 180 | 350 | ... | 1:3 |
| II | | | | |
| III | 180 | 180 | 3.3 | 1:3 |
| IV | 180 | 180 | 5.5 | 1:4 |
| V | 180 | 180 | 4.5 | 1:5 |
| VI | 170 | 180 | 4 | 1:4 |
| VII | 170 | 180 | ... | 1:4 |
| VIII | 170 | 180 | ... | 1:4 |
| IX | 170 | 180 | 7 | 1:3 |
| X | 180 | 180 | ... | 1:5 |
| XI | 180 | 180 | ... | 1:1.5 POT/DBSA* |
| XII | 180 | 150 | 10 | 1:4 |
| XIII | 180 | 150 | 10 | 1:3 |
| XIV | 180 | 150 | 10 | 1:4 |
| XV | 180 | 300 | 10 | 1:4 |
| XVI | 180 | 350 | 9 | 1:4 |

*POT = poly (3-octylthiophene)

TABLE 5

Processing conditions of products made from a solidified PANI/DBSA blend with a matrix polymer in a mixing apparatus according to Method C

| Test no. | Solidification # | PANI + DBSA [g] | Matrix plastic [g] | Ratio PANI/DBSA | T [°C.] | Mixing cycles | R |
|---|---|---|---|---|---|---|---|
| 46 | I | 4 | 8 PS | 1:3 | 180 | 5 | 13 kΩ |
| 49 | II | 4 | 8 PS | 1:3 | 180 | 5 | 50 kΩ |
| 50 | II | 4 | 8 PS | 1:3 | 180 | 5 | 5 kΩ |
| 51 | II | 3 | 9 PS | 1:3 | 180 | 5 | OL |
| 52 | II | 4 | 8 PS | 1:3 | 180 | 5 | 8 kΩ |
| 53 | III | 4 | 8 PS | 1:3 | 180 | 5 | 50 kΩ |
| 54 | IV | 4 | 8 PS | 1:4 | 180 | 5 | 10 kΩ |
| 55 | V | 4 | 8 PS | 1:5 | 180 | 5 | 1 kΩ |
| 57 | III | 4 | 8 PVC | 1:3 | 170 | 5 | 250 MΩ |
| 58 | V | 4.5 | 10 PVC | 1:5 | 170 | 5 | 40 kΩ |
| 59 | IV | 4.5 | 10 PVC | 1:4 | 170 | 5 | 700 kΩ |
| 60 | III | 4 | 8 SB | 1:3 | 170 | 5 | 50 kΩ |
| 61 | IV | 4 | 8 SB | 1:4 | 170 | 10 | NO TP 600 kΩ |
| 62 | IV | 4 | 8 SB | 1:4 | 170 | 10 | NO TP 600 kΩ |
| 63 | Tests 61 + 62 | 4 | 8 SB | 1:4 | 170 | — | 50 kΩ |
| 64 | VI | 4 | 8 PS | 1:4 | 170 | 5 | 5 kΩ |
| 65 | VII | 4 | 8 PS | 1:4 | 170 | 5 | 12 kΩ |
| 66 | VIII | 4 | 8 PS | 1:4 | 170 | 5 | 5 kΩ |
| 67 | VIII | 4 | 8 SB | 1:4 | 170 | 5 | 3 kΩ |
| 68 | VIII | 3 | 9 SB | 1:4 | 170 | 5 | 20 kΩ |

Legend of abbreviations:
PANI = polyaniline,
DBSA = dodecylbenzenesulfonic acid (purified grade),
PS = polystyrene,
T = temperature,
R = measured resistance,
LDPE = low density-polyethene,
HDPE = polyethene,
PA = polyamide,
SB = styrenebutadiene copolymer,
OL = outside meter scale,
NO TP = no test piece.

Such a granulated PANI/DBSA product was used to make a compressed test piece no. 46 containing 30% of the granulated product and the rest 70% of Neste grade PS-164. The compressed test piece no. 45 thus obtained had after the first run a fully defect-free surface and a measured resistance of approx. 13 kΩ. The next compressed test piece no. 47, made from the same product, showed again some surface defects. The next test was repeated using screened granulates. In this compressed test piece the number of surface defects was increased further. The above results led to a conclusion that the complex may be hygroscopic, whereby the granules can absorb moisture from the ambient humidity. Consequently, the next granulate lot was poured into a plastic jar and the jar was sealed immediately after the run. The jar lid was opened only for making a blend. Test pieces no. 49 through 52 were made of such a lot, and they are were found to be free of surface defects.

Figure 2:
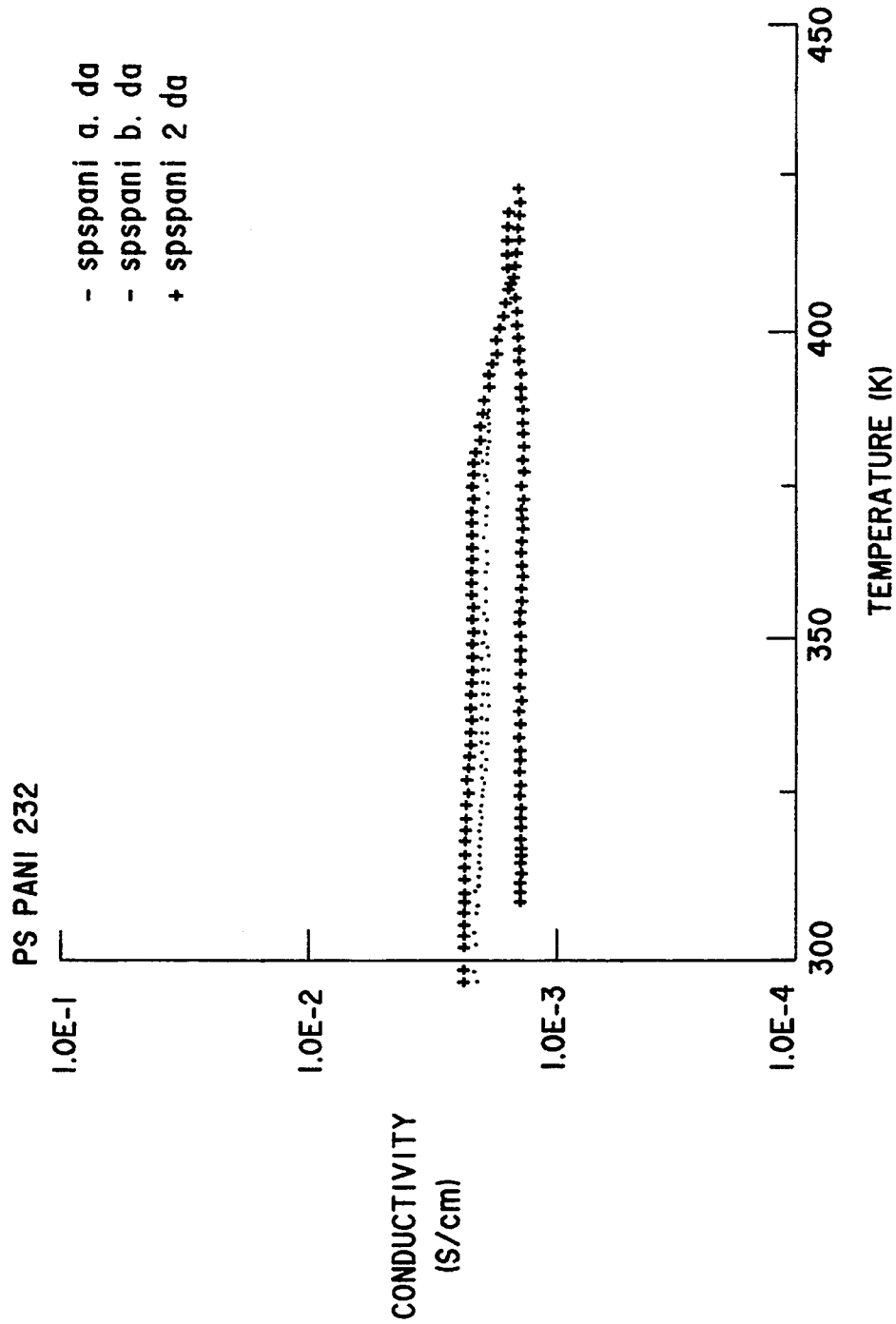
FIG. 2 is a plot of conductivity vs. temperature for test piece No. 54.

Compressed test pieces no. 53 through 63 were made from the abovementioned granulates. Test pieces no. 53 and 54 (blend III) made from blends containing PS-164 were free of surface defects. The conductivities of these test pieces were measured separately and found to be: No. 53, $1 \times 10^{-3}$ S/cm and no. 54, $2 \times 10^{-2}$ S/cm. The thermal conductivities vs. temperature for the test pieces made by way of the method according to the invention were examined separately. The conductivity as a function of temperature is shown in FIGS. 1 and 2, wherein such typical curves are drawn for test pieces no. 53 and 54 made from PS-PANI-DBSA blends. The temperature cycles for test piece no. 53 were 25° C.→120° C.→25° C. and for test piece no. 54, 25° C.→150° C.→25° C., using a heating gradient of 1° C./min. As is evident from the graphs, the test pieces were extremely stable.

The PANI/DBSA Batch no. 9 was dried for 3 h at 90° C. The dried lot was protonated and tested. Injection-molded test pieces from run V containing PS exhibited some flow marks. On the other hand, the measured resistances were lowest in these test pieces. The resistances of the PVC blends were in the range 40–700 kΩ. The test pieces containing PVC had a satisfactory surface quality. A portion of the lot was granulated three times according to the method at 180° C. Subsequently, an injection molding run (fourth melt-processing cycle) was performed with polystyrene. The measured resistances were: Test piece no. 66, 5 kΩ, and test piece no. 67, 3 kΩ. All test pieces had a good surface quality.

EXAMPLE 69

400 g PANI and 2880 g DBSA (weight ratio 1:7.2) were mixed in a blender. To the mixture 720 g PANI-EB powder was added which also was dispersed with the blender. The so prepared dark grey liquid mixture was solidified by a screw melt mixing process according to the FI-patent application 915760, which is hereby incorporated by reference, at a temperature about 185° C. As result a neutral, solid, well melting complex with a resistance 500Ω was obtained.

EXAMPLE 70

0.2 g of zinc dioxide (ZnO) powder and 0.6 g of liquid dodecylbenzene sulfonic acid (ZnO:DBSA=1:3 w/w) were mixed together. The mixing was made with a dispersion mixer, whereafter the mixture was solidified by heat-mixing in a plastic processor at 150° C. The product was a white salt having a melting point of 115° C. The ZnO-DBSA salt was ground into a powder or granulate using a mill or granulator.

To 15 g of PANI/DBSA (PANI:DBSA=1:1.2 w/w) complex doped in a dispersion was mechanically blended with 15 g of the above ZnO-DBSA salt. The blend was melt-mixed with a screw melt mixer according to FI 915760, which is hereby incorporated by reference, at a temperature of 130° C. As a result a neutral, light green complex was obtained having a resistance of 5 MΩ.

EXAMPLE 71

A PANI-DBSA pre-mixture was prepared at weight ratio 1:4. A blend was prepared by mixing PANI-DBSA pre-mixture and 8 to 10 wt % ZnO. After mixing the blend was acidic. The blend was solidified in a melt-processing apparatus, the temperature of which was about 170° C. The formed solid product had a resistance about 250Ω and pH was about 5 to 6.

Analysis of the PANI/DBSA product

The polyaniline (PANI) employed had the emeraldine base form (produced by Neste Oy, Finland). The PANI/DBSA complex was made according to the abovedescribed solidification method C and the polyolefin blends were mixed using polyolefin grades by Neste Oy.

1.Polyaniline structure

Thermal analysis: The thermal analysis exhibited a broad endothermic range with a maximum peak value at 180° C. as seen in FIG. 4. In the case of polyaniline emeraldine base this crystallinity maybe due to additional doping inducing hydrogen bonding possibilities for this order formation.

X-ray diffraction: Analysis by X-ray diffraction revealed the above mentioned crystalline structure in the polyaniline (FIG. 5) which was almost completely removed by a thermal treatment at temperature above the 180° C. melting.

The melting of doped polyaniline crystals at the same temperature range has been observed earlier. It is not intention to restrict the starting polyaniline material with the described crystallinity but to describe the possible crystalline structure for polyaniline because the method described in this invention will yield a new type of ordered polyaniline based material which does not remind the above described polyaniline crystals.

2. PANI-DBSA complex structure

Thermal analysis: A thermal analysis of PANI/DBSA clearly indicates the start of the exothermic range from 110° C. peaking at approx. 170° C. The same exotherm can be detected in the test piece made from PANI/SULFOSOFT (commercial grade of DBSA) (FIG. 11). This exotherm can be assumed to represent the complexing heat of the free DBSA. The thermal analysis of the components in the mechanically mixed blend corroborated this assumption (FIG. 10). Said exotherm facilitates a quantitative examination of the complexation process. In prior at the complexation has always been carried out in a liquid or gaseous phase, or alternatively, in solid phase at ambient temperature, where calorimetry is difficult to carry out. An additional exotherm can be found in all test pieces at approx. 220° C., which may be accounted for further complexation, thermal degradation of DBSA and/or PANI and/or PANI/DBSA complex or possible crosslinking reactions.

Figure 9:
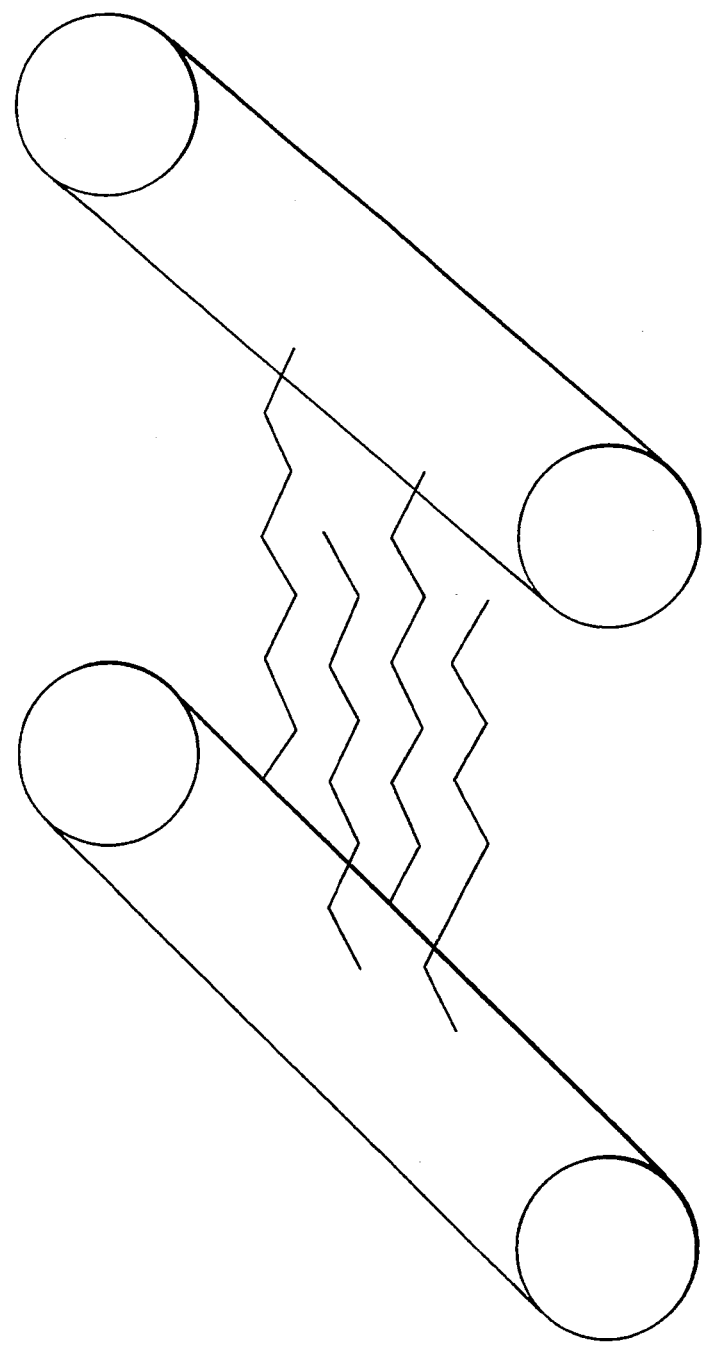
FIG. 9 is a schematic picture of the layered structure.

X-ray diffraction: An analysis by X-ray diffraction revealed layered crystalline structure which may also be interdigitated (FIG. 7 Sulfosoft, FIG. 8 Lab, FIG. 9 Model). The obtained value of 27 Å for the layer constant is in agreement with earlier investigations in which layered polythiophenes were examined.

3. Processability of the PANI complex

Figure 34:
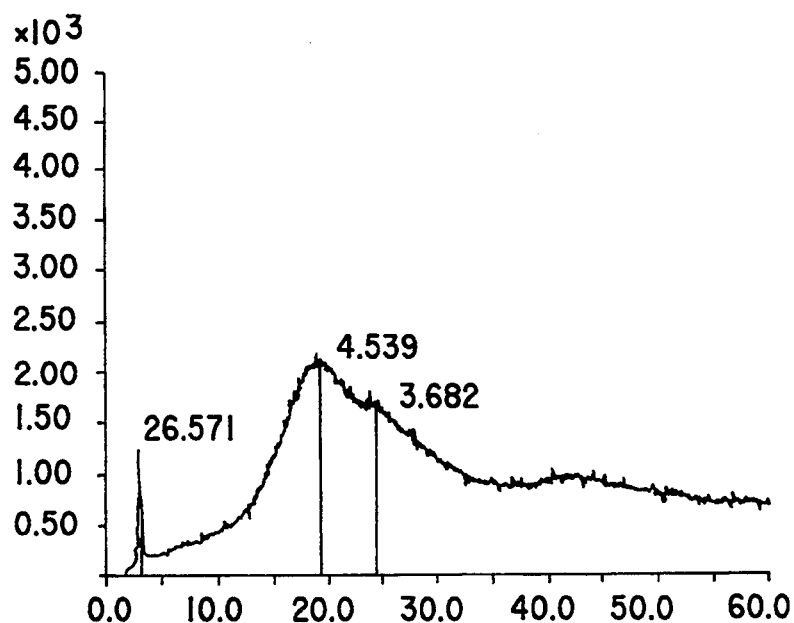

After washing with water, the complex was found to be conducting, nonsoluble and non-heat-processable. No layered crystalline structure can be found in the X-ray diffractogram. By re-adding the same amount of DBSA to the complex as was washed away, a conducting, soluble and heat-processable complex is obtained having a layered structure in its X-ray diffractogram (FIG. 34). The 1:2.5 (PANI/DBSA) complex characterized in the diagram was solidified at 80° C. for 2 h. The layered structure is evident at point 26.571.

Figure 35:
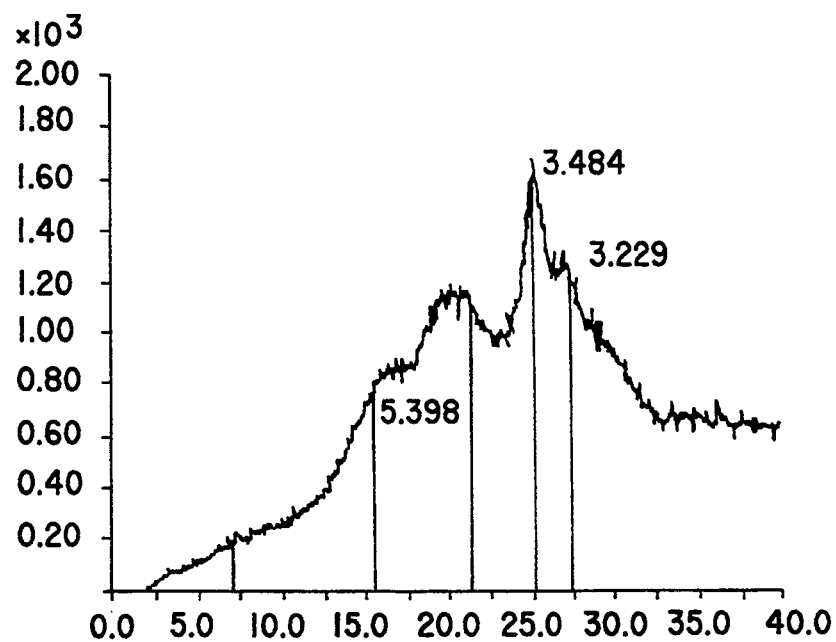

A complex produced according to a state-of-the-art method has the same properties as described above. No layered structure is seen in the X-ray diffractogram (FIG. 35). The product can be made heat-processable by adding DBSA. Analogously, a layered structure appears in the X-ray diffraction analysis.

X-ray diffractometry have shown that the solidified PANI compositions of the invention have a unique structure that is e.g. markedly different from the structures of commercially available PANI compositions.

Figure 36:
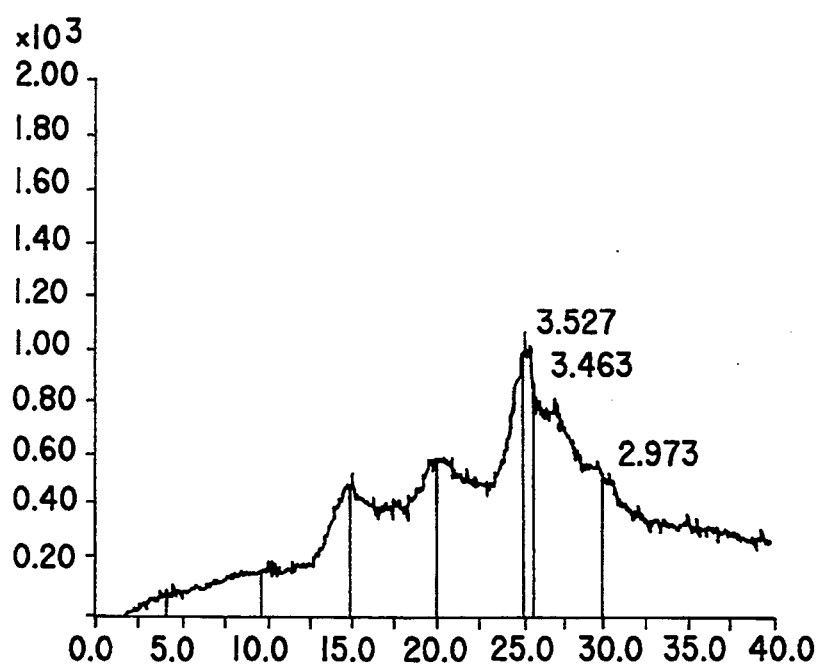

A PANI complex produced by emulsion polymerization does not either exhibit a layered structure (FIG. 36). The situation is the same if the doping is carried out in a solvent (ethanol, chloroform) at an elevated temperature.

4. Blends of a complex and a matrix polymer

The complex can be either completely dispersed in the matrix polymer, partially phase separated or even dissolved (miscible) with the matrix polymer. Examples of complete dispersion or partial phase separation can be indicated by the two separate glass transitions as seen in FIG. 13, and by the x-ray diffraction spectra (FIGS. 14, 15 and 16) which all show the ordered regions for the both components. The miscibility can be analyzed from the melting point depression data in FIGS. 17–22 from the x-ray diffraction data (FIG. 23) which does not show any order for the compound material indicating the high degree of dissolution and from the optical micrographs (FIGS. 24–33) which show homogenous phase structures. It is not the intention to restrict the extent of possible morphologies but to prove that the compound material can be mixed in various degrees of mixing depending on the mixing conditions.

We claim:

1. A process for the preparation of a solid, electrically conductive plastic material comprising:
   (a) blending a polyaniline compound with a functionalized protonic acid in a weight ratio of 1:10–3:1,
   (b) heat-treating the blend of step (a) by using melt processing equipment at 80° to 210° C. for 10 seconds to 20 minutes,
   (c) mixing the heat-treated blend of step (b) with a thermoplastic polymer in a weight ration of 1:100 to 20:1, and
   (d) melt processing the mixture of step (c) to yield said solid, electrically conductive plastic material.

2. A method according to claim 1 wherein the blend is heat treated at a pressure of 1 to $10^4$ kPa in an inert atmosphere.

3. A method according to claim 1 wherein said polyaniline compound is selected from the group consisting of emeraldine, leucoemeraldine, protoemeraldine, nigraniline and toluprotoemeraldine.

4. A method according to claim 3 wherein the polyaniline compound is emeraldine.

5. A method according to claim 1 wherein the polyaniline compound is a polyaniline derivative.

6. A method according to claim 1 wherein the polyaniline compound has an average molecular weight of at least 5,000 g/mol.

7. A method according to claim 1 wherein the functionalized protonic acid is a sulfonic acid.

8. A method according to claim 7 wherein the functionalized protonic acid is an aromatic sulfonic acid.

9. A method according to claim 8 wherein the aromatic sulfonic acid is dodecylbenzenesulfonic acid.

10. A method according to claim 1 wherein said functionalized protonic acid is in stoichiometric excess.

11. A method according to claim 7 wherein the weight ratio of polyaniline compound to functionalized protonic acid is between 10 and 3:1.

12. A method according to claim 8 wherein the weight ratio of polyaniline compound to functionalized protonic acid is between 1:8 and 1:4.

13. A method according to claim 1 further comprising adding a small amount of a thermoplastic resin to the polyaniline compound and functionalized protonic acid prior to heat-treating.

14. A method according to claim 1 wherein the thermoplastic polymer is selected from the group consisting of a homopolymer or copolymer of styrene, a styrene derivative, a vinyl compound, an olefin, blends thereof and a thermoplastic condensation polymer.

* * * * *